United States Patent
Osako

(10) Patent No.: US 9,352,223 B2
(45) Date of Patent: May 31, 2016

(54) GAME SYSTEM, GAME APPARATUS, STORAGE MEDIUM AND GAME CONTROLLING METHOD

(75) Inventor: Satoru Osako, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 462 days.

(21) Appl. No.: 13/370,726

(22) Filed: Feb. 10, 2012

(65) Prior Publication Data

US 2013/0143666 A1 Jun. 6, 2013

(30) Foreign Application Priority Data

Dec. 1, 2011 (JP) .................................. 2011-263360

(51) Int. Cl.
*H04W 84/18* (2009.01)
*H04W 88/06* (2009.01)
*A63F 13/30* (2014.01)

(52) U.S. Cl.
CPC ......... *A63F 13/12* (2013.01); *A63F 2300/5566* (2013.01)

(58) Field of Classification Search
CPC ... H04W 84/18; H04W 88/06; H04M 1/7253; A63F 2300/5566
USPC .......................................................... 463/42
See application file for complete search history.

(56) References Cited

U.S. PATENT DOCUMENTS

| | | | | |
|---|---|---|---|---|
| 2002/0055978 A1* | 5/2002 | Joon-Bo et al. | ............... | 709/209 |
| 2004/0203378 A1* | 10/2004 | Powers | ......................... | 455/41.2 |
| 2006/0069543 A1* | 3/2006 | Sajwani et al. | ................ | 703/24 |
| 2007/0274271 A1* | 11/2007 | Jones et al. | .................... | 370/338 |
| 2009/0318219 A1* | 12/2009 | Koustas et al. | ................. | 463/23 |
| 2010/0197405 A1* | 8/2010 | Douceur et al. | ................ | 463/42 |
| 2012/0040752 A1* | 2/2012 | Koo | ............................... | 463/29 |
| 2012/0057518 A1* | 3/2012 | Herrala et al. | ................ | 370/315 |
| 2012/0088585 A1* | 4/2012 | Harris et al. | .................... | 463/42 |

FOREIGN PATENT DOCUMENTS

| | | |
|---|---|---|
| EP | 2 400 812 A1 | 6/2010 |
| JP | 2002-111689 A | 4/2002 |
| JP | 2008-012071 A | 7/2006 |
| JP | 2007-125185 A | 5/2007 |
| JP | 2007-301045 A | 11/2007 |
| JP | 2011-087650 A | 10/2009 |
| JP | 2010-029723 A | 2/2010 |
| JP | 2011-078634 | 4/2011 |

* cited by examiner

*Primary Examiner* — James S McClellan
*Assistant Examiner* — Syvila Weatherford
(74) *Attorney, Agent, or Firm* — Nixon & Vanderhye, P.C.

(57) ABSTRACT

An example of a game system includes a plurality of game apparatuses, and a matching server decides game apparatuses as players (A, B), and game apparatuses as game masters (C-E) in response to a request from the game apparatus. During the game play, operation data in response to an operation input to each of the game apparatuses (A, B) is transmitted to the game apparatuses (C-E), and in the game apparatuses (C-E), game processing is executed. Result data of the game processing is transmitted to the game apparatuses (A, B). When the data is saved, the encoded game data is transmitted from each of the game apparatuses (C-E) to the game apparatuses (A, B), and saved there.

13 Claims, 24 Drawing Sheets

GAME SYSTEM, GAME APPARATUS, STORAGE MEDIUM AND GAME CONTROLLING METHOD

CROSS REFERENCE OF RELATED APPLICATION

The disclosure of Japanese Patent Application No. 2011-263360 filed on Dec. 1, 2011 is incorporated herein by reference.

FIELD

The present embodiment relates to a game system, a game apparatus, a storage medium and a game controlling method. More specifically, the present embodiment relates to a game system, game apparatus, storage medium and game controlling method that transmits and receives data between a plurality of game apparatuses.

SUMMARY

It is a primary object of the present embodiment to provide a novel game system, a game apparatus, a storage medium and a game controlling method.

Furthermore, another object of the present embodiment is to provide a game system, a game apparatus, a storage medium and a game controlling method capable of distributing the load of game processing without preparation of a game server.

A first embodiment is a game system, including a first game apparatus, a second game apparatus and a third game apparatus of the same type that are connectable to each other on a network, in which a first communication game is played between the first game apparatus and the second game apparatus. The first game apparatus comprises a first input data transmitter which transmits in response to an input by a first user first input data corresponding to the input, to the third game apparatus. The second game apparatus comprises a second input data transmitter which transmits in response to an input by a second user second input data corresponding to the input, to the third game apparatus. The third game apparatus not playing the first communication game comprises a first game processing executer which executes game processing on the basis of the first input data transmitted by the first input data transmitter and the second input data transmitted by the second input data transmitter. That is, the first game apparatus and the second game apparatus merely transmit the input data in response to the inputs by the user to the third game apparatus, and the third game apparatus that does not participate as a player in the first communication game to be played between the first game apparatus and the second game apparatus executes the game processing of the first communication game.

According to the first embodiment, the first game apparatus and the second game apparatus that play the communication game merely transmit the input data to the third game apparatus, and the game processing is executed in the third game apparatus, and therefore, it is possible to distribute the load of the game processing without preparation of a game server.

A second embodiment is according to the first embodiment, and a game system further comprises a first matcher. The first matcher decides the first game apparatus, the second game apparatus and the third game apparatus out of a plurality of game apparatuses. For example, the first game apparatus and the second game apparatus are game apparatuses of users that are approximate in the game level (experience point) and the total playing minute. Also, a game apparatus which is other than the first game apparatus and the second game apparatus and to which a function of executing the communication game in the other two groups or being a reserve game apparatus is not assigned is decided as a third game apparatus.

According to the second embodiment, the first to third game apparatuses are decided from a plurality of game apparatuses in a selectable manner by the first matcher that is different from the first to third game apparatuses out of the devices included in the game system, and therefore, each time the communication game is played, a match-up with a different player can be realized, and the game processing is executed by an unspecific game apparatus. Accordingly, every time that the communication game is played, the player with which a match-up is made is different, and therefore, it is possible to increase interest of the communication game. Also, the third game apparatus that executes the game processing is not fixed, and therefore, the game apparatus that is able to execute the game processing can be assigned, capable of effectively utilizing processable resources.

A third embodiment is according to the second embodiment, and a game system further comprises a fourth game apparatus which is connectable to at least the third game apparatus. The first matcher decides at least the third game apparatus and the fourth game apparatus. The third game apparatus plays a second communication game with the fourth game apparatus being different from the first game apparatus and the second game apparatus in a case that the game processing is executed by the first game processing executer. For example, the second communication game is a communication game the same type or different type of the first communication game.

According to the third embodiment, the third game apparatus can execute the game processing of the communication game that is executed between the first game apparatus and the second game apparatus, and can play the communication game with another game apparatus.

A fourth embodiment is according to the second embodiment, and a game system further comprises a fifth game apparatus and a sixth game apparatus which are connectable to at least the first game apparatus. A third communication game is played between the fifth game apparatus and the sixth game apparatus. For example, the third communication game is a communication game the same type or different type of the first communication game or the second communication game. The fifth game apparatus comprises a third input data transmitter which transmits in response to an input by a third user third input data corresponding to the input, to the first game apparatus. The sixth game apparatus comprises a fourth input data transmitter which transmits in response to an input by a fourth user fourth input data corresponding to the input, to the first game apparatus. The first game apparatus not playing at least the third communication game further comprises a second game processing executer which executes game processing on the basis of the third input data transmitted by the third input data transmitter and the fourth input data transmitted by the fourth input data transmitter. That is, the first game apparatus which plays the first communication game executes game processing of the third communication game executed between the fourth game apparatus and the fifth game apparatus.

According to the fourth embodiment, a game apparatus which participates in the first communication game executed in a certain group as a player can execute the game processing of the third communication game executed in another group without participating in the third communication game as a player.

A fifth embodiment is according to the first embodiment, and a game system further comprises a plurality of third game apparatuses. Each of the plurality of third game apparatuses further includes a result data transmitter which transmits result data of the game processing executed by the first game processing executer to the first game apparatus and the second game apparatus. On the other hand, each of the first game apparatus and the second game apparatus further comprises a result data receiver which receives a plurality of sets of result data transmitted by the result data transmitter of the plurality of third game apparatuses, and an output controller which causes an output device to output the proper result data from the plurality of sets of the result data received by the result data receiver.

According to the fifth embodiment, the first game apparatus and the second game apparatus output proper result data out of the plurality of sets of the result data that are acquired from the respective third game apparatuses, and therefore, it is possible to prevent the result data obtained through an illegal act such as performance of the game processing by using the modified game data from being reflected on the communication game.

A sixth embodiment is according to the fifth embodiment, and a game system further comprises at least the three third game apparatuses. The output controller of each of the first and second game apparatuses compares the plurality of sets of the result data received by the result data receiver, and outputs the result data which is identical and the largest in number, out of the plurality of sets of the result data. That is, the result data selected (decided) based on majority rule is output.

According to the sixth embodiment, it is possible to prevent an illegal act from occurring by a simple method such as a majority rule.

A seventh embodiment is according to the first embodiment, and a game system further comprises a seventh game apparatus being a reserve of the third game apparatus. The seventh game apparatus comprises a reserve game processing executer which executes the game processing in place of the third game apparatus on the basis of the first input data transmitted by the first input data transmitter and the second input data transmitted by the second input data transmitter in a case that the connection with the third game apparatus is disconnected. That is, the reserve game processing executer has a function the same as that of at least first game processing executer.

According to the seventh embodiment, a reserve game apparatus is prepared, and therefore, it is possible to prevent the communication game from being suspended due to the disconnection of the third game apparatus.

An eighth embodiment is according to the first embodiment, and a game system further comprises an encoding device being connectable to at least the third game apparatus. The third game apparatus further comprises a first game data transmitter which transmits to the encoding device the game data changed in correspondence with game processing executed by the first game processing executer. That is, the third game apparatus requests another device to encode the game data. The encoding device further comprises an encoder which encodes the game data transmitted by the first game data transmitter, and a first encoded data transmitter which transmits encoded game data encoded by the encoder to the third game apparatus. That is, the encoding device receives a request to encode game data from the third game apparatus, encodes the game data, and transmits the encoded game data to the third game apparatus being the source of the request.

A third game apparatus further comprises a second encoded data transmitter which transmits the encoded game data transmitted by the first encoded data transmitter to the first game apparatus and the second game apparatus. Each of the first and second game apparatuses further comprises a storage which stores the encoded game data transmitted by the second encoded data transmitter. That is, when the third game apparatus receives the encoded game data, it transmits the encoded game data to the first game apparatus and the second game apparatus. Then, the first game apparatus and the second game apparatus each receives the encoded game data, and saves it.

According to the eighth embodiment, the game data to be used when the communication game is played is encoded and stored in the game apparatus, and therefore, the game apparatus that plays the communication game cannot directly read the game data. Accordingly, it is possible to prevent the game data from being modified (tampered) as much as possible, and prevent an illegal act in the communication game from occurring before it arises.

A ninth embodiment is according to the eighth embodiment, and a game system further comprises a second matcher which decides a plurality of game apparatuses of the same kind that are connectable to each other on a network. The encoder encodes the game data in a case that a combination of the first game apparatus, the second game apparatus and the third game apparatus that play the game by using the game data transmitted by the first game data transmitter is decided by the second matcher. That is, if the combination of the game apparatuses which play the communication game and the game apparatuses which execute the game processing is correct, the game data is encoded.

According to the ninth embodiment, in a case that the game apparatus which is a source of a request for encoding is correctly combined with the game apparatuses which play the communication game, the game data is encoded, and thus, the game data is never encoded in response to an unauthorized request. Thus, the communication game is never played by utilizing unauthorized game data thereafter.

A tenth embodiment is according to the eighth embodiment, and a game system further comprises a decoding device which is connectable to at least the third game apparatus. Each of the first and second game apparatuses further comprises a third encoded data transmitter which transmits the encoded game data stored by the storage to the third game apparatus. That is, each of the first and second game apparatuses transmits the saved encoded game data to the third game apparatus before starting the communication game.

The third game apparatus further comprises a fourth encoded data transmitter which transmits the encoded game data transmitted by the third encoded data transmitter to the decoding device. The decoding device further comprises a decoder which decodes the encoded game data transmitted by the fourth encoded data transmitter, and a second game data transmitter which transmits the game data decoded by the decoder to the third game apparatus. That is, when the third game apparatus receives the encoded game data, it requests the decoding device to decode the encoded game data. In response thereto, the decoding device decodes the encoded game data, and transmits the decoded game data to the third game apparatus being the source of the request. Accordingly, in the third game apparatus, by using the decoded game data, the game processing of the communication game that are played between the first game apparatus and the second game apparatus is executed.

According to the tenth embodiment, the encoded game data is stored in each of the first and second game apparatuses, and when the communication game is played, the encoded game data is decoded by the decoding device in response to a request from the third game apparatus, and therefore, the player with which the communication game is played need not be fixed, and thus, it is possible to play the communication game with various players.

An eleventh embodiment is according to the tenth embodiment, and the decoder decodes the encoded game data in a case that a combination of the first game apparatus, the second game apparatus and the third game apparatus that play the game by using the game data of the encoded game data transmitted by the fourth encoded data transmitter is decided by the second matcher.

According to the eleventh embodiment, if a combination with the game apparatuses which play the communication game is correctly made, the encoded game data is decoded, and therefore, it is possible to prevent the unauthorizedly created encoded game data from being decoded, and prevent the encoded game data from being decoded in response to a request from the game apparatus which is incorrectly combined.

A twelfth embodiment is according to the tenth embodiment, wherein the first game processing executer executes the game processing on the basis of the first input data transmitted by the first input data transmitter, the second input data transmitted by the second input data transmitter, and the game data transmitted by the second game data transmitter.

According to the twelfth embodiment, the third game apparatus can execute the game processing by using the decoded game data according to the input data from the first game apparatus and the second game apparatus. Thus, it is possible to distribute the load of the game processing.

A thirteenth embodiment is a game apparatus that is connectable to a first game apparatus and a second game apparatus of the same type on a network, and that executes game processing of a communication game to be played between the first game apparatus and the second game apparatus without playing the communication game, comprising: a game processing executer which executes the game processing on the basis of first input data from the first game apparatus and second input data from the second game apparatus, and a result data transmitter which transmits result data of the game processing executed by the game processing executer to the first game apparatus and the second game apparatus.

A fourteenth embodiment is a storage medium storing a game program of a game apparatus that is connectable to a first game apparatus and a second game apparatus of the same type on a network, and that executes game processing of a communication game to be played between the first game apparatus and the second game apparatus without playing the communication game, the game program causes a computer of the game apparatus to execute: a game processing executer which executes the game processing on the basis of first input data from the first game apparatus and second input data from the second game apparatus, and a result data transmitter which transmits result data of the game processing executed by the game processing executer to the first game apparatus and the second game apparatus.

A fifteenth embodiment is a game controlling method of a game apparatus that is connectable to a first game apparatus and a second game apparatus of the same type on a network, and that executes game processing of a communication game to be played between the first game apparatus and the second game apparatus without playing the communication game, a computer of the game apparatus comprising: (a) executing the game processing on the basis of first input data from the first game apparatus and second input data from the second game apparatus, and (b) transmitting result data of the game processing executed in the step (a) to the first game apparatus and the second game apparatus.

In the thirteenth to fifteenth embodiments as well, similar to the first embodiment, it is possible to distribute the load of the game processing without preparation of a game server.

The above described objects and other objects, features, aspects and advantages of the present embodiment will become more apparent from the following detailed description of the present embodiment when taken in conjunction with the accompanying drawings.

DETAILED DESCRIPTION OF NON-LIMITING EXAMPLE EMBODIMENTS

Figure 1:
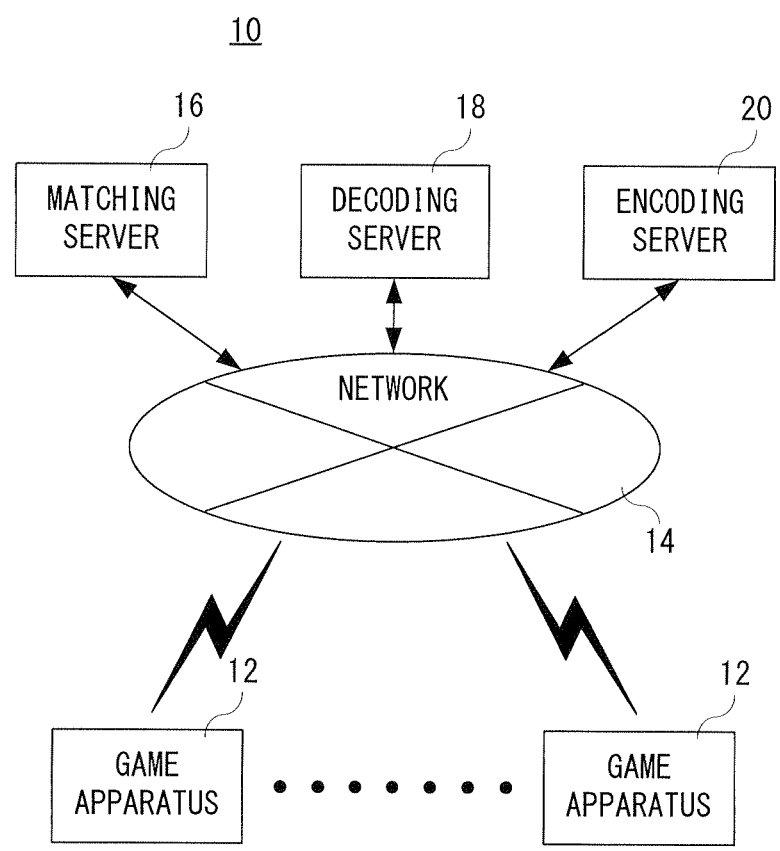
FIG. 1 shows an example non-limiting game system of the present embodiment.

Referring to FIG. 1, a game system 10 of the present non-limiting example embodiment includes a plurality of game apparatuses 12, and each of the plurality of game apparatuses 12 is connected to a matching server 16, a decoding server 18 and an encoding server 20 via a network 14 so as to make communications with each other.

Figure 2:
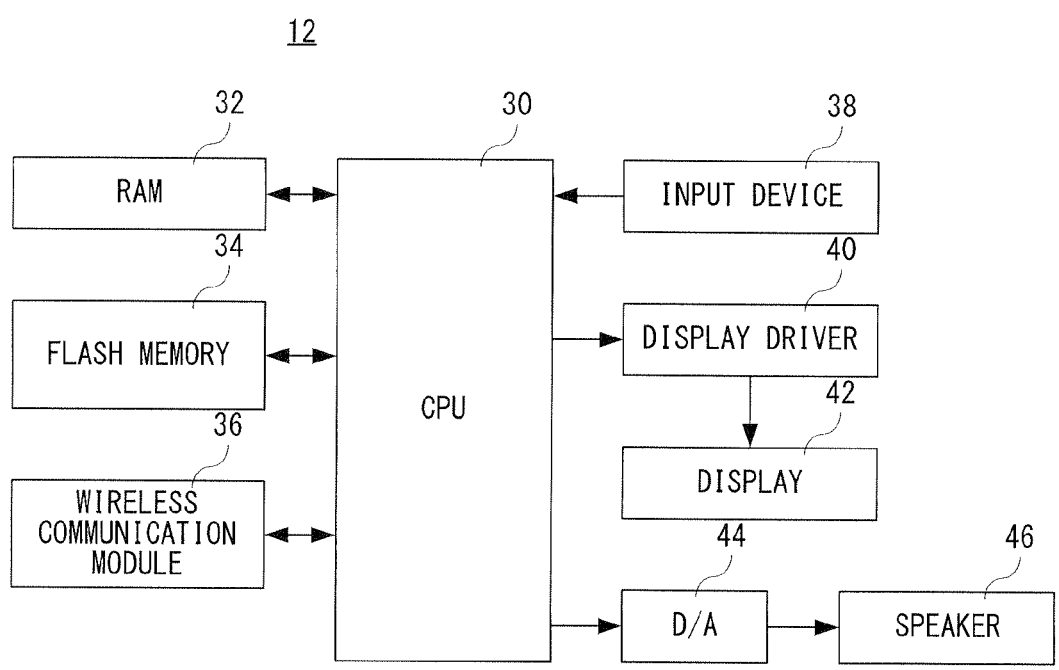
FIG. 2 is a block diagram showing an example non-limiting electric configuration of the game apparatus shown in FIG. 1.

FIG. 2 is a block diagram showing an example non-limiting electric configuration of the game apparatus 12 shown in FIG. 1. As shown in FIG. 2, the game apparatus 12 includes a CPU 30, and the CPU 30 is connected with a RAM 32, a flash memory 34, a wireless communication module 36, an input device 38, a display driver 40 and a D/A converter 44. Also, the display driver 40 is connected with a display 42, and the D/A converter 44 is connected with a speaker 46.

The CPU 30 entirely controls the game apparatus 12. The RAM 32 is used as a working memory and a buffer memory of the CPU 30. The flash memory 34 is used for storing (saving) application programs such as a game, and various sets of data.

The wireless communication module 36 has a function of connecting to a wireless LAN. Accordingly, the game apparatus 12 can communicate with other game apparatuses 12 and computers (server 16, 18, 20, etc.) directly or over the network 14.

The input device 38 is various push buttons or switches that are provided to the game apparatus 10, for example, and is used for various operations, such as selecting options from a menu, a game operation, etc. Here, as an input device 38, an inputter, such as a pointing device like a touch panel, etc., a microphone, a camera, etc. may be provided in place of the push buttons or the switches, or together with the push buttons or the switches.

The display driver 40 is used for displaying various images such as game images on the display 42 under an instruction of the CPU 30. Although illustration is omitted, the display driver 40 contains a video RAM (VRAM).

The D/A converter 44 converts audio data applied from the CPU 30 to an analog game voice, and outputs it to the speaker 46. Here, the game sounds means sound necessary for the game, such as onomatopoeic sound of game characters, sound effects, music (BGM).

It should be noted that the electric configuration of the game apparatus 12 as shown in FIG. 2 is merely one example, and there is no need of being restricted thereto.

Although the illustration and detailed description are omitted, the matching server 16, the decoding server 18 and the encoding server 20 that are shown in FIG. 1 are general-purpose servers, and each includes components, such as a processor like a CPU, a memory (HDD, ROM, RAM, etc.), a communication module, etc. The reason why the decoding server 18 and the encoding server 20 are provided is that by decoding and encoding with devices other than the game apparatuses 12, it is possible to prevent the encoded game data from being unauthorizedly decoded by game apparatuses 12 as described later. Accordingly, the encoding format can employs arbitrary formats, but the formats, etc. are not opened.

In such a game system 10, the matching server 16 accepts a participation request from each game apparatus 12, decides some game apparatuses 12 as players to play the communication game, and decides other game apparatuses 12 as game masters of the communication game. Here, in this embodiment, the game apparatus 12 (CPU 30, or the like) can execute processing as a player and processing as a game master of different two communication games (groups). Accordingly, the game apparatus 12 can participate in a communication game of a certain group as a player and in communication games of the other groups as a game master. Although the detailed description is omitted, the communication games in which the game apparatus 12 participates as a player and participates as a game master may be the same type or different types.

For example, the game apparatuses 12 of users which are similar in game level (experience point) and total playing minute are decided as game apparatuses 12 as players (may be referred to as being subject to matching in this embodiment). Here, the game level (experience point) and the total playing minute are managed by the matching server 16 for each user (game apparatus 12). Furthermore, the game apparatuses 12 which are other than the game apparatuses 12 decided as players and are not assigned the game masters of the two groups or a backup node described later are decided as game apparatuses 12 as game masters (may be referred to as being subject to matching in this embodiment). Hereafter, in a case that the game apparatus 12 functions as game masters in the two groups, the game master relative to the one group is called a "first game master", and the game master relative to the other group is called a "second game master".

Additionally, the matching server 16 manages the game apparatuses 12 decided as players and the game apparatuses 12 decided as game masters as one group. In this embodiment, a terminal list of each group is generated, and stored in the memory. In the terminal list, in correspondence with the identification information of the game apparatus 12, the connection information of the game apparatus 12 and discrimination between a player and a game master (kind) are described. In this embodiment, the identification information and the connection information of the game apparatus 12 are collectively referred as terminal information hereafter.

For example, the identification information of the game apparatus 12 is an MAC address of the wireless communication module contained in the game apparatus 12, specific identification symbol given to the game apparatus 12, a name (user name, etc.) given to the game apparatus 12, etc. Furthermore, the connection information of the game apparatus 12 is an IP address assigned to the game apparatus 12.

In the matching server 16, such groups are generated depending on the number of game apparatuses 12 from which a participation request is issued. Hereafter, focusing on one group, description is made on game processing, etc. in this embodiment, but this holds true for other groups.

In this embodiment, the game apparatus 12 as a game master means a game apparatus 12 the same type as the game apparatus 12 as a player, and a game apparatus 12 that mainly performs game processing on the basis of operation data from the game apparatuses 12 as players that play the communication game in which the game apparatus 12 as game master itself does not participate. Furthermore, in this embodiment, the game apparatus 12 as a game master requests the decoding server 18 to decode the save data (encoded game data) transmitted from the game apparatuses 12 as players prior to the start of the communication game, and requests the encoding server 20 to encode the game data generated by the game processing according to an instruction form the game apparatuses 12 as players.

It should be noted that in this embodiment, the matching server 16 decides the game apparatuses 12 as players and game apparatuses 12 as game masters, but the game apparatuses 12 as players and the game apparatuses 12 as game masters may be decided by different servers. Here, the game apparatuses 12 as players and the game apparatuses 12 as game masters are brought into correspondence with each other such that they are managed as one group.

Figure 3:
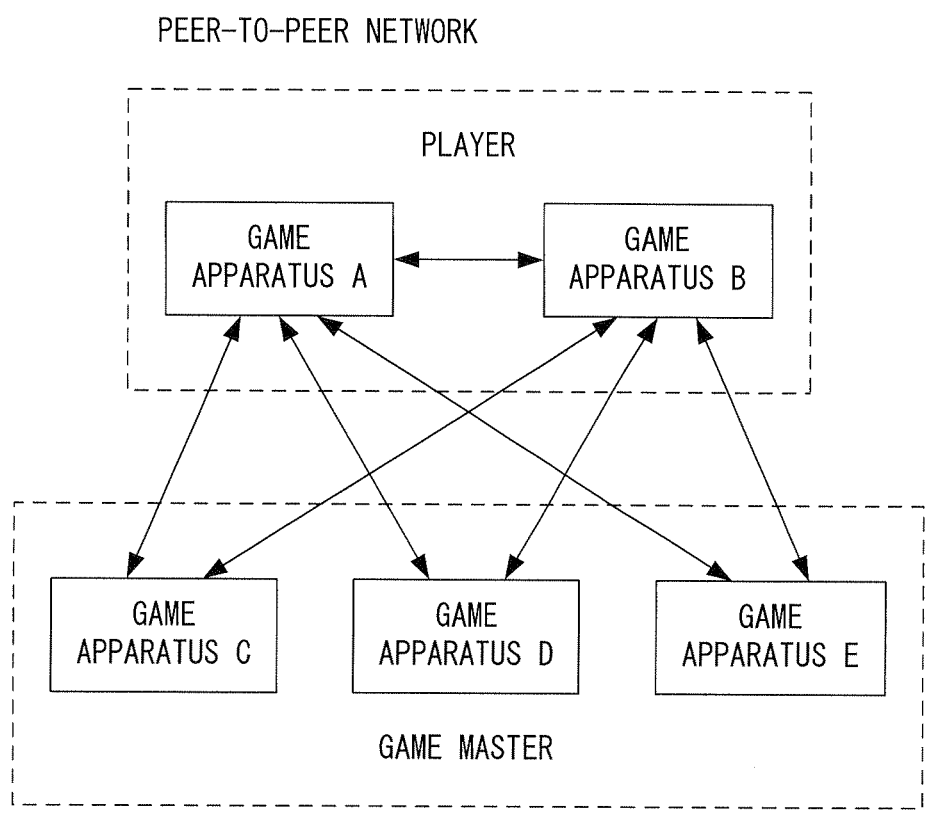
FIG. 3 shows an example non-limiting peer-to-peer network making up of game apparatuses decided as players and as game masters in a case that a communication game is played.

In this embodiment, in one group, two game apparatuses 12 are decided as players, and three game apparatuses 12 are decided as game masters in association with them. Then, by the game apparatuses 12 as players and the game apparatuses 12 as game masters which make up of one group, a peer-to-peer network as shown in FIG. 3 is built. Hereinafter, in this embodiment, in a case that the game apparatuses 12 are differentiated from one another, the two game apparatuses 12 as players are called a game apparatus A and a game apparatus B, and the three game apparatuses 12 as game masters are called a game apparatus C, a game apparatus D and a game apparatus E.

Thus, when the game apparatuses 12 as players and the game apparatuses 12 as game masters are decided to build the peer-to-peer network, game playing processing is executed among the decided game apparatuses 12. Accordingly, it is possible to distribute the load of the game processing without preparing a game server.

Also, the game playing processing is executed in the decided game apparatuses 12, and thus, when the matching server 16 creates a terminal list, it transmits the created terminal list to each of the game apparatuses 12 in the group. Accordingly, each game apparatus 12 stores the terminal list.

In this embodiment, the game apparatus 12 stores the game data relating to the communication game in an encoded manner. However, game data (hereinafter referred to as "encoded game data")) encoded in a format that cannot be decoded by the game apparatus 12 is stored (saved). This is because of preventing raw game data (plain text) from being modified (tampered) by a user of the game apparatus 12. Accordingly, in this embodiment, the game data that is decoded is stored in the game apparatuses 12 as game masters, and each of the game apparatuses 12 as game masters executes game processing on the basis of the operation data from the game apparatuses 12 as players. That is, each of the game apparatuses 12 as game masters executes game processing according to operation data from the game apparatuses 12 as players by using the game data. Then, result of the processing (result data) is transmitted to the game apparatuses 12 as players.

It should be noted that if the encoded game data is tampered, this cannot be decoded by a decoding device (decoding server 18 in this embodiment), and thus, it is almost impossible to perform the game processing according to unauthorized game data.

In this embodiment, the game data is parameter data (kind, power, strength, quickness, etc.) as to player characters and possessed items, etc., and it does not include operation data. However, the game data need not be restricted to it and, and is data capable of advancing the communication game advantageously or disadvantageously by being modified (tampered).

Accordingly, in a case that encoded game data, that is, save data is stored in the game apparatuses 12 as players, the data loading processing is executed prior to start of the communication game. This data loading processing is executed by the game apparatuses 12 as players (A, B), the game apparatuses 12 as game masters (C-E), the matching server 16 and the decoding server 18.

It should be noted that in a case that the communication game is first played, the save data is not stored, and thus, game data based on initial values (default value) is stored in the game apparatuses 12 as game masters (C-E) without execution of the data loading processing.

Figure 4:
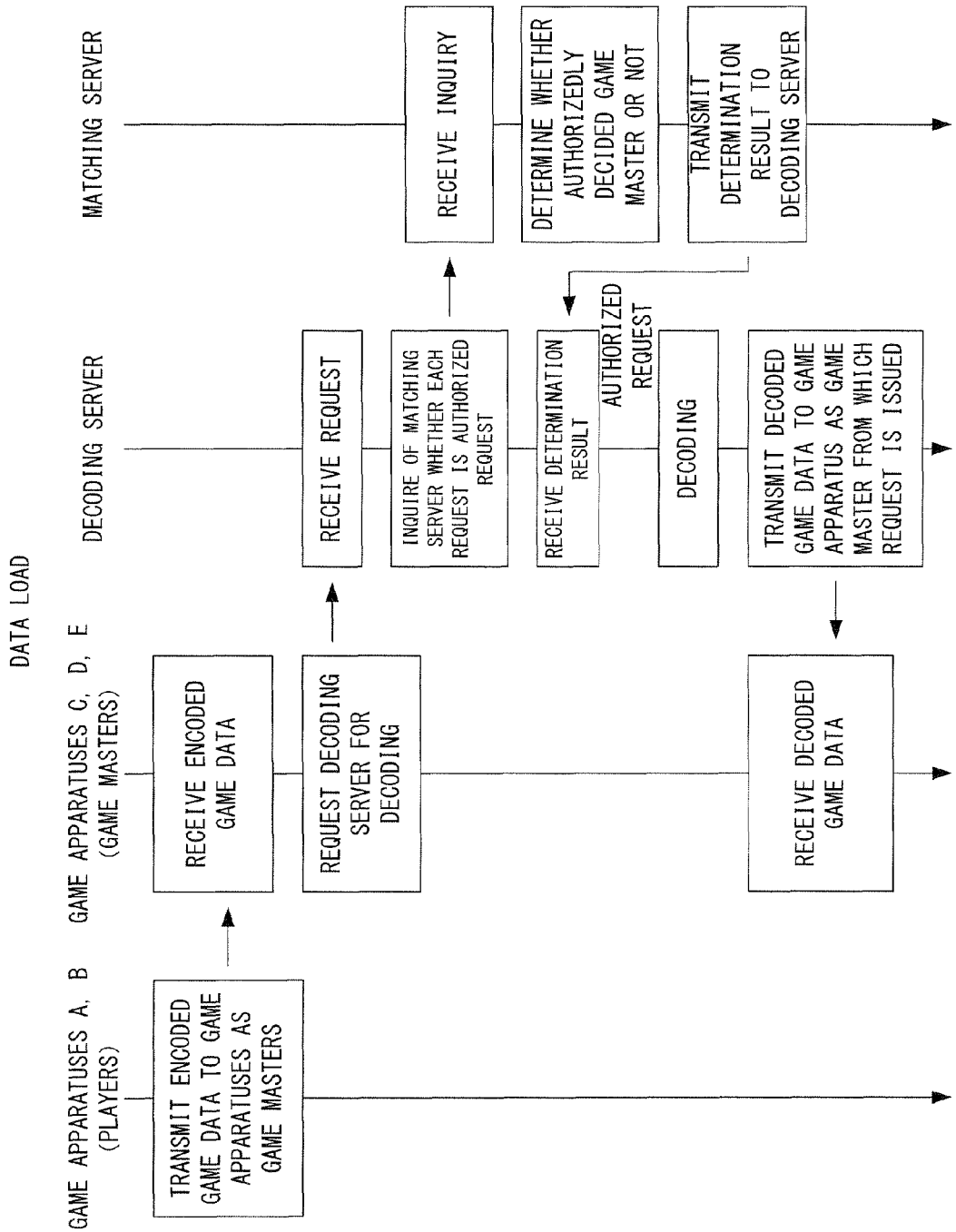
FIG. 4 shows an example non-limiting rough flows of processing by game apparatuses as players, game apparatuses as game masters, a decoding server and a matching server in a case that data is loaded.

As shown in FIG. 4, the game apparatuses A, B as players transmit the save data (encoded game data) to each of the game apparatuses C-E as game masters. Hereinafter, the encoded game data stored in the game apparatus A may be called "encoded game data A", and the encoded game data stored in the game apparatus B may be called "encoded game data B".

Here, to the encoded game data, identification information of the game apparatuses A, B storing it is added as header information (meta information).

Each of the game apparatuses C-E as game masters receives the encoded game data A and receives the encoded game data B. Next, each of the game apparatuses C-E requests to decode the encoded game data A, and requests to decode the encoded game data B. More specifically, each of game apparatuses C-E transmits the request for decoding and the encoded game data A to the decoding server 18, and transmits the request for decoding and the encoded game data B to the decoding server 18.

Here, the game apparatuses C-E as game masters need not simultaneously receive the encoded game data A and the encoded game data B and need not simultaneously request for decoding.

The decoding server 18 inquires of the matching server 16 whether the each of the requests from the game apparatuses C-E as game masters is an authorized request. It should be noted that the inquiry is made for each request. More specifically, the decoding server 18 acquires terminal information (hereinafter referred to as "player terminal information", for convenience of explanation) of the game apparatus 12 as a player from the meta information of the encoded game data, acquires terminal information of the source of the request for decoding (hereinafter referred to as "source of the request for decoding terminal information" for convenience of explanation), and transmits an inquiry including the player terminal information and the source of the request for decoding terminal information to the matching server 16.

When the matching server 16 receives the request, it determines whether an authorizedly decided game master or not. That is, the combination between the game apparatuses 12 as players and the game apparatuses 12 as game masters is correct. More specifically, the matching server 16 determines whether or not the game apparatus 12 indicated by the player terminal information and the game apparatus 12 indicated by the source of the request for decoding terminal information belong to the same group, the game apparatus 12 indicated by the player terminal information is decided as a player, and the game apparatus 12 indicated by the source of the request for decoding terminal information is decided as a game master. Then, the matching server 16 transmits the determination result to the decoding server 18.

The decoding server 18 receives the determination result, decodes the encoded game data if the request is from the authorizedly decided game master, and transmits the decoded game data to the game apparatus 12 as a game master being a source of the request for decoding.

Accordingly, the game apparatus 12 as a game master being a source of the request for decoding receives the decoded game data, and stores it in the RAM 32. Thus, the authorizedly decided game apparatus 12 as a game master acquires the game data on the game apparatus A as a player and the game data on the game apparatus B as a player. Hereinafter, for convenience of explanation, the game data obtained by decoding the encoded game data A is referred to as "game data A", and the game data obtained by decoding the encoded game data B is referred to as "game data B".

When the data loading processing is ended, the communication game is started. When the communication game is started, the game playing processing is performed by the game apparatuses A, B as players and the game apparatuses C-E as game masters.

Figure 5:
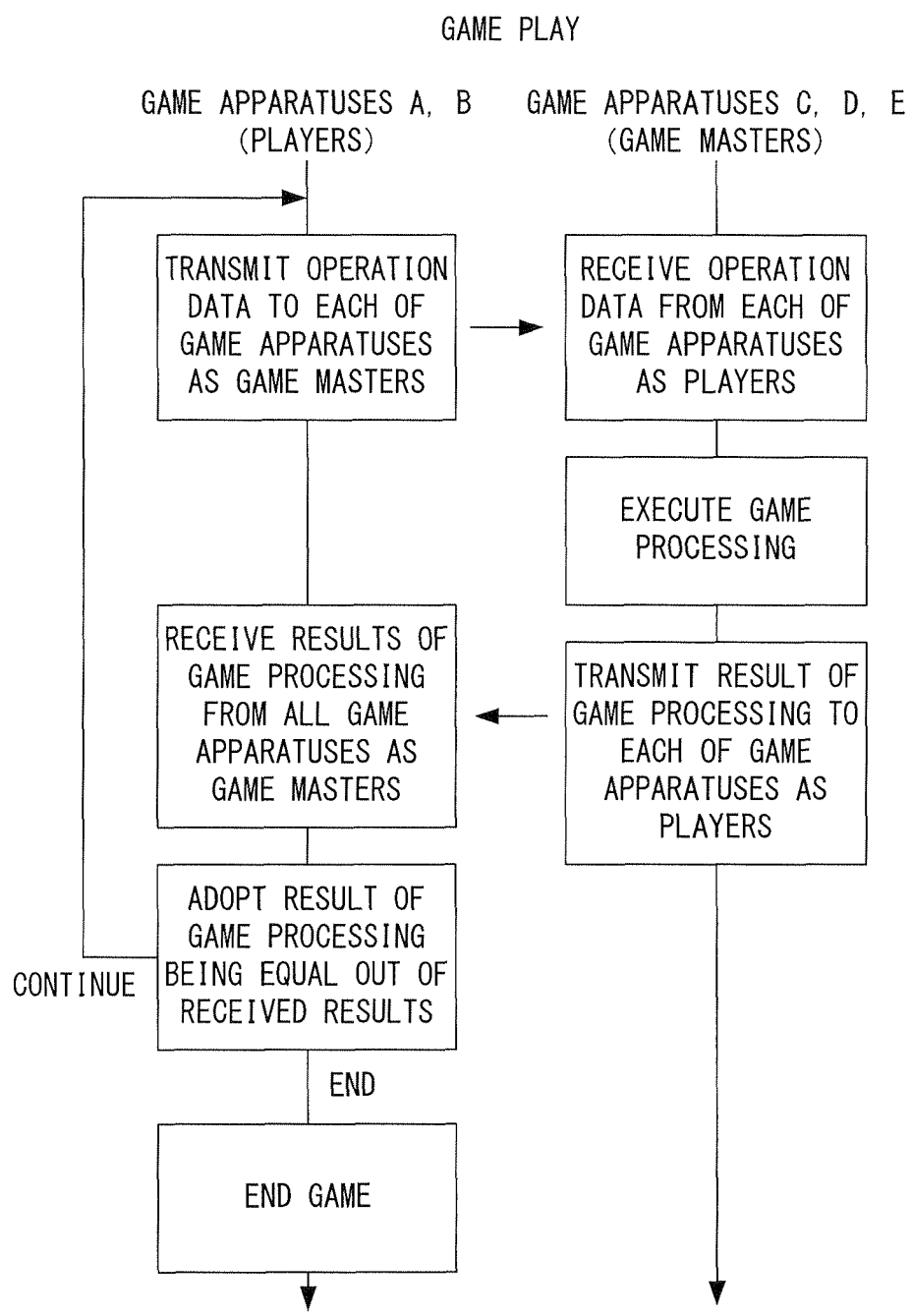
FIG. 5 shows an example non-limiting rough flows of processing by the game apparatuses as players and the game apparatuses as game masters in a case that a communication game is played.

As shown in FIG. 5, in the game playing processing, operation data in response to an operation input to the game apparatus A as a player (hereinafter referred to as "operation data A" for convenience of explanation) is transmitted to each of the game apparatuses C-E, and operation data in response to an operation input to the game apparatus B as a player (hereinafter referred to as "operation data B" for convenience of explanation) is transmitted to each of the game apparatuses C-E.

When each of the game apparatuses C-E as game masters receives both of the operation data A and the operation data B, it executes the game processing of the communication game by using the game data A and the game data B according to the operation data A and the operation data B. Then, the result of the game processing (result data) is transmitted to each of the game apparatus A as a player and the game apparatus as a player B.

It should be noted that each of the game apparatuses C-E as game masters stores the game program for executing the game processing of the communication game to be executed between the game apparatuses A, B as players in advance. For example, the game program for executing the game processing of the communication game to be executed between the game apparatuses A, B as players is downloaded from the matching server 16.

Each of the game apparatuses A and B receives the result data, and outputs the result data. For example, each of the game apparatuses A and B depicts (updates) and outputs (displays) game images on the basis of the result data, and generates and outputs game sounds. Here, as described above, the game apparatus 12 as a player transmits the operation data to all the game apparatuses 12 as game masters, all the game apparatuses 12 as game masters execute the game processing, and then, the game apparatus 12 as a player receives the result data from each of all the game apparatuses 12 as game masters. Thus, the game apparatus 12 as a player adopts and outputs proper result data from all the received sets of result data (three, here). In this embodiment, out of the three sets of result data, the result data being identical is adopted as proper result data. That is, based on majority rule, the result data to be output is decided.

The reason why the result data being identical is adopted and output is that although the game apparatus 12 as a game master is an authorizedly decided, but the game apparatus 12 as a game master can access the raw game data of the game apparatus 12 as a player in the communication game in which it is in charge of the game processing, and thus can modify (tamper) it. Thus, by adopting one result data based on majority rule as described above, it is possible to prevent the result data of the game processing performed based on the unauthorized game data from being reflected on the communication game as much as possible. Due to this, it is possible to avoid an illegal act such as hindering other's communication game. Also, the reason why the result data to be adopted based on majority rule is decided is that it is considered that such illegal act is performed by a few users. This holds true for deciding the encoded game data described later based on majority rule.

Before the game is ended, the aforementioned processing is repeatedly executed. In response to occurrence of a predetermined event during the game, an input of an instruction by the player during the game, or the game end, data saving processing is executed. The data saving processing is executed by the game apparatuses A, B as players, the game apparatuses C-E as game masters, the matching server 16 and the encoding server 20.

Figure 6:
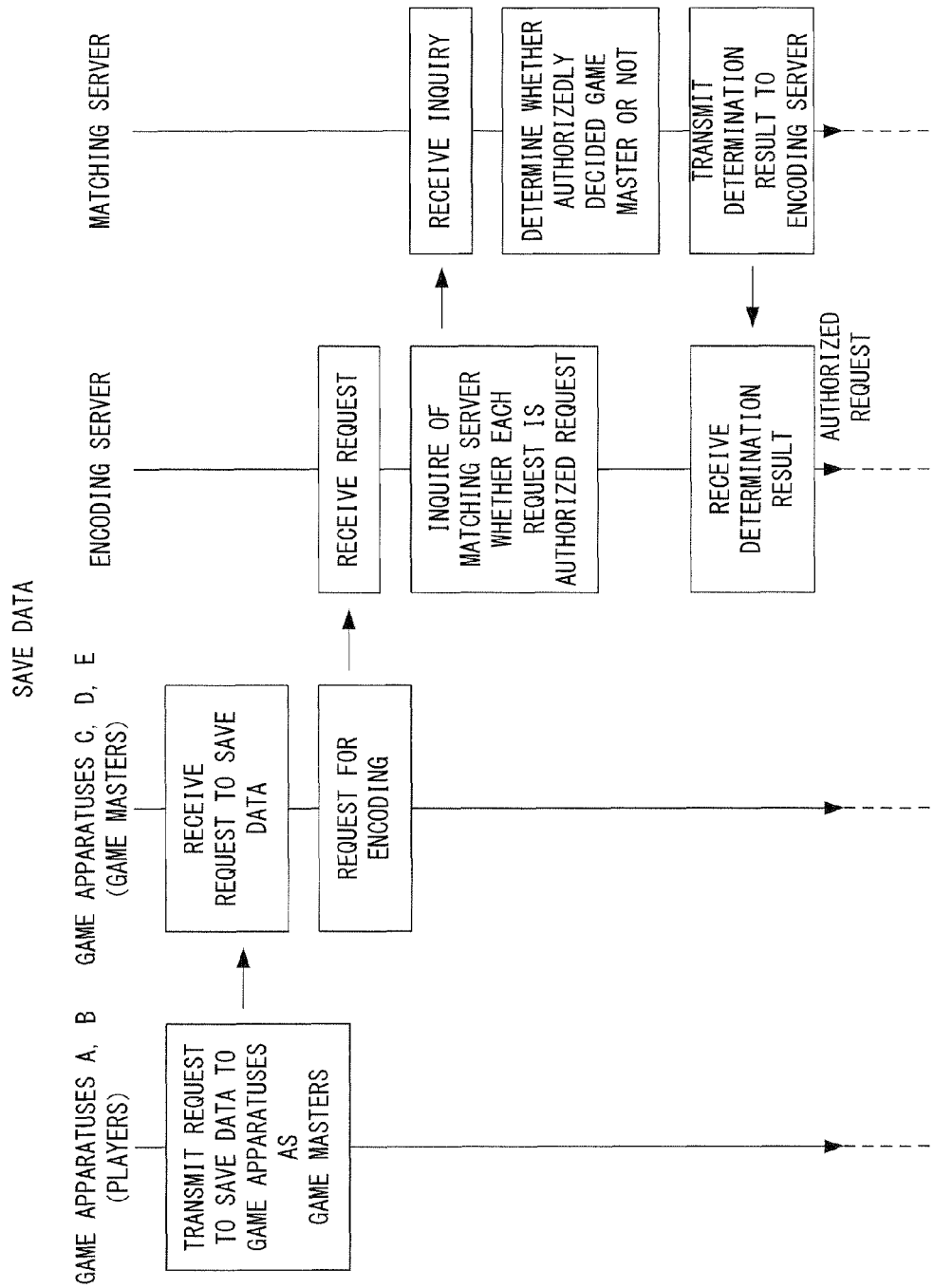
FIG. 6 shows an example non-limiting part of rough flows of processing by the game apparatuses as players, the game apparatuses as game masters, an encoding server and the matching server in a case that data is saved.

More specifically, as shown in FIG. 6, each of the game apparatuses A, B as players requests the game apparatuses C-E as game masters to save data.

When each of the game apparatuses C-E as game masters receives a request to save data, it requests the encoding server 20 to encode the game data. More specifically, each of the game apparatuses C-E as game masters transmits the request for encoding and the game data on the game apparatus 12 as a player being a source of the request to the encoding server 20. Here, to the game data, the identification information of the game apparatus A or the game apparatus B is added as header information (meta information).

When the encoding server 20 receives the request for encoding and the game data, it inquires of the matching server 16 whether the request is an authorized request. More specifically, the encoding server 20 acquires the player terminal information from the meta information of the game data and the terminal information of the source of the request for encoding (hereinafter referred to as "source of the request for encoding terminal information" for convenience of explanation), and transmits an inquiry including the player terminal information and the source of the request for encoding terminal information to the matching server 16.

When the matching server 16 receives the inquiry, it determines whether or not the request is from the authorizedly decided game master. More specifically, the matching server 16 determines whether or not the game apparatus 12 indicated by the player terminal information and the game apparatus 12 indicated by the source of the request for encoding terminal information belong to the same group, the game apparatus 12 indicated by the player terminal information is decided as a player, and the game apparatus 12 indicated by the source of the request for encoding terminal information is decided as a game master. Then, the matching server 16 transmits the determination result to the encoding server 20.

Figure 7:
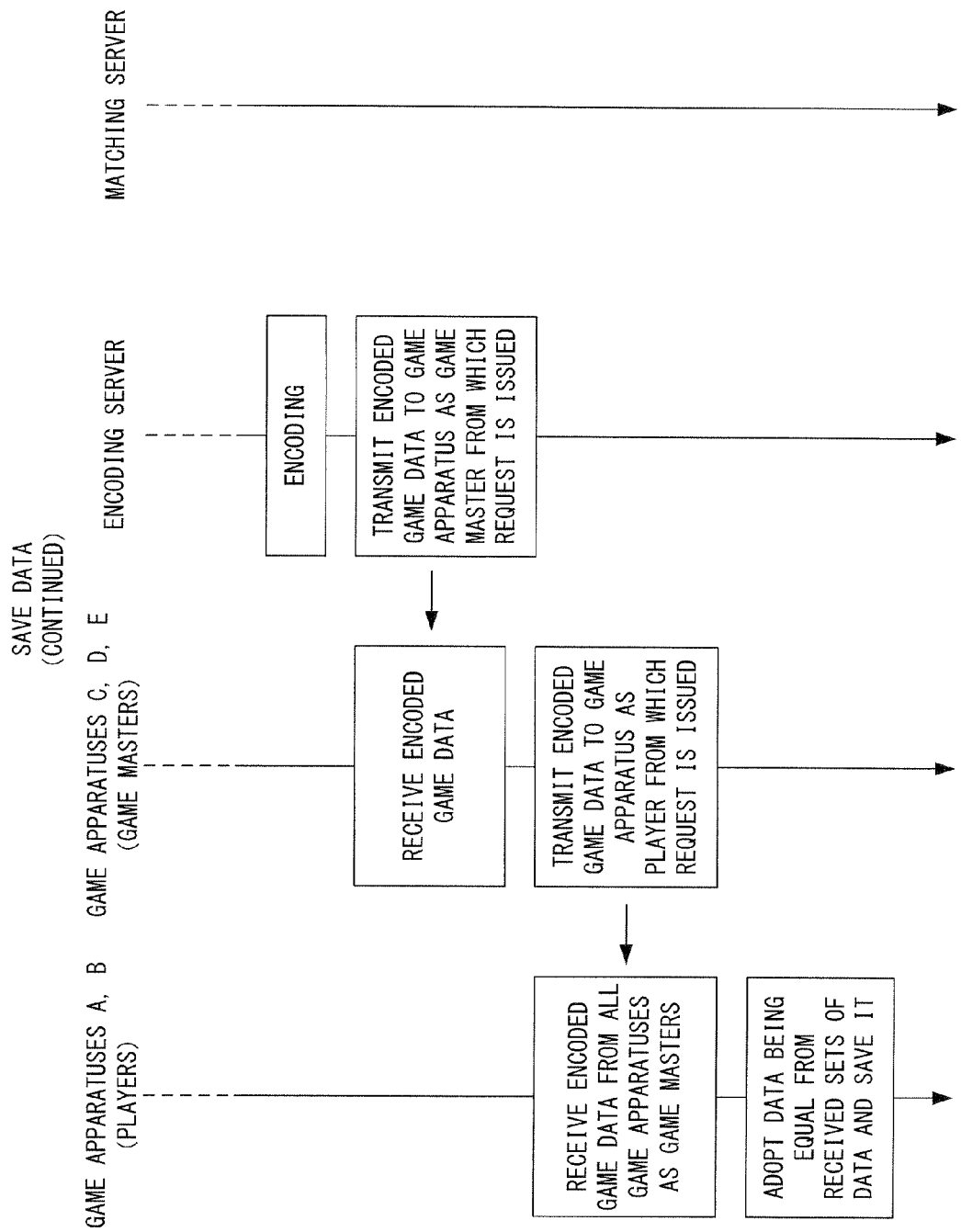
FIG. 7 shows an example non-limiting sequel to the rough flows of the processing by the game apparatuses as players, the game apparatuses as game masters, the encoding server and the matching server in a case that data is saved.

The encoding server 20 receives the determination result, encodes the game data if the authorizedly decided game master is determined, and transmits the encoded game data to the game apparatus 12 as a game master being a source of the request for encoding as shown in FIG. 7. In addition, when the game apparatus 12 as a game master receives the encoded game data, it transmits the encoded game data to the game apparatus 12 as a player being a source of request to save data. Naturally, the encoding server 20 encodes the game data in a format that are decodable by the decoding server 18.

Accordingly, the game apparatus 12 as a player that requests to save data receives the encoded game data. Here, as described above, the game apparatus 12 as a player transmits a request to save data to all the game apparatuses 12 as game masters, and thus receives the encoded game data from all the game apparatuses 12 as game masters if they are authorizedly decided. Thus, the game apparatus 12 as a player adopts and saves proper encoded game data from all the received sets of encoded game data (three, here). In this embodiment, out of the three sets of encoded game data, the encoded game data being identical is adopted as proper encoded game data. That is, based on majority rule, one encoded game data to be saved is decided.

Moreover, during the game, the game apparatus 12 as a game master may disconnect the connection (communication). Even in such a case, a game apparatus 12 as a reserve (hereinafter referred to as "backup node") for continuing the communication game may be prepared. In such a case, the matching server 16 decides the game apparatus 12 as a backup node when the game apparatuses 12 as players and the game apparatuses 12 as game masters are decided in response to a participation request from the game apparatus 12. Accordingly, in the terminal list that is created in the matching server 16 and is to be transmitted to each game apparatus 12, identification information, and connection information of the game apparatus 12 as a backup node and the kind (backup node) are included. The backup node matching (deciding) processing is the same as the game master matching (deciding) processing, and therefore, a redundant description is omitted.

When the game apparatus 12 as a game master is disconnected, the game apparatus 12 as a backup node is promoted to the game master, and a game apparatus 12 as a backup node is newly decided.

By using FIG. 8 and FIG. 9, backup node promoting and matching processing will be described in detail assuming that the game apparatus D is disconnected here. Furthermore, the game apparatus 12 as a backup node is called a "game apparatus F". In addition, the game apparatus 12 as a backup node that is newly decided is called a "game apparatus G".

Figure 8:
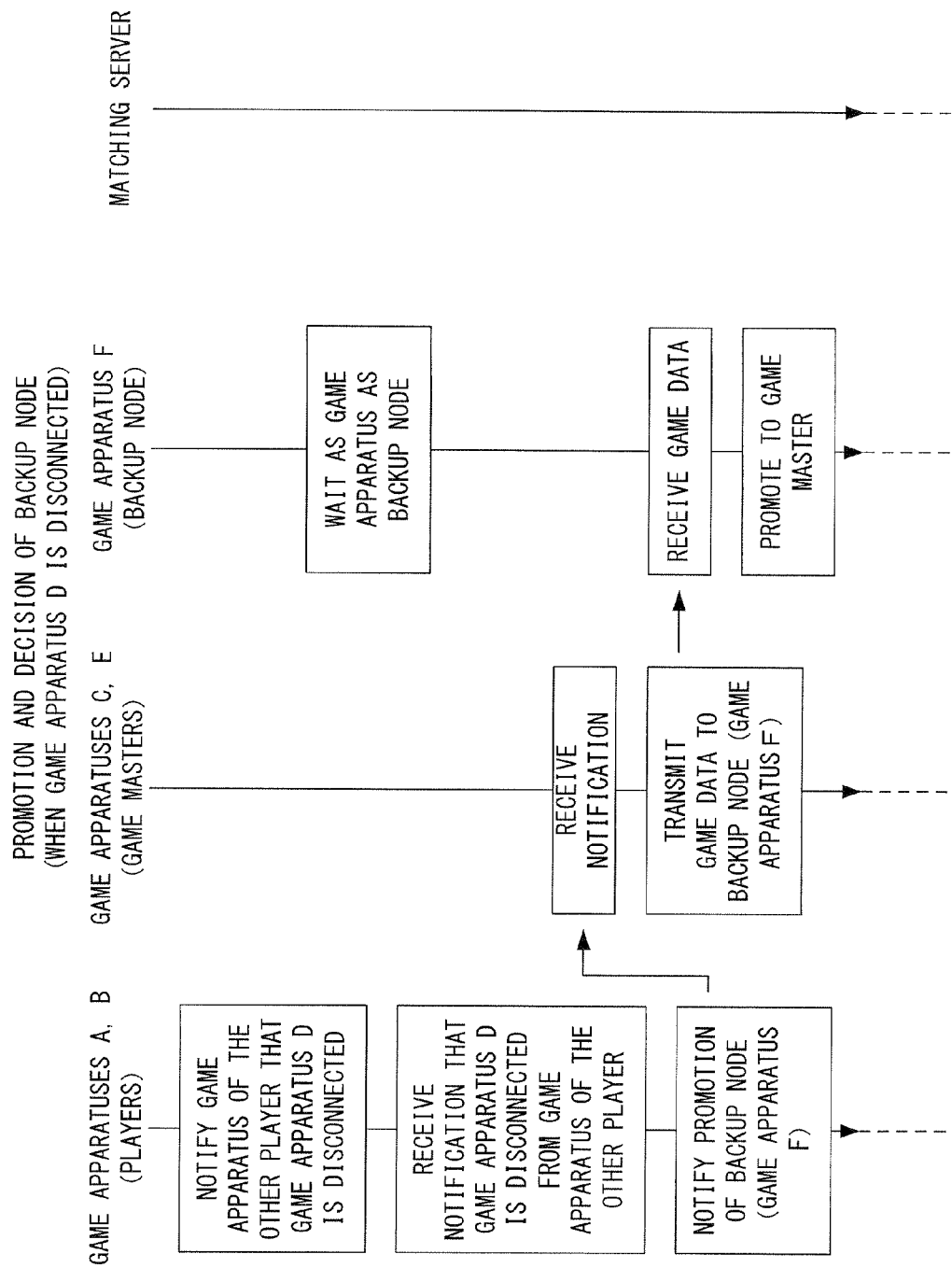
FIG. 8 shows an example non-limiting part of rough flows of processing by the game apparatuses as players, the game apparatuses as game masters, a game apparatus as a backup node and the matching server in a case that the a backup node is promoted and decided.

As shown in FIG. 8, each of the game apparatuses A, B as players detects the disconnection of the game apparatus D. In this embodiment, in a case that the game apparatus 12 as a player cannot acquire result data even after a predetermined time (10 sec., for example) has elapsed from the transmission of the operation data to the game apparatus 12 as a game master, it detects that the connection with the game apparatus 12 from which the result data cannot acquired is disconnected.

When one of the game apparatuses A, B detects the disconnection of the game apparatus D, it notifies the other game apparatus B, A the fact. Accordingly, each of the game apparatus A, B receives the notification that the game apparatus D is disconnected from each other's game apparatuses B, A. That is, the disconnection of the game apparatus D is confirmed by the game apparatuses A, B as players. Then, each of game apparatuses A, B notifies the game apparatuses C, E as game masters with which the connections are not disconnected of a promotion of the backup node (game apparatus F).

When the game apparatuses C, E receive a notification of promotion of the backup node, they transmit the game data to the game apparatus F as a backup node. The game apparatus F which waits for data transmission as a backup node is promoted when receiving the game data. Here, actually, the game apparatus 12 as a backup node is promoted to the game master when the terminal list is updated as described later.

Figure 9:
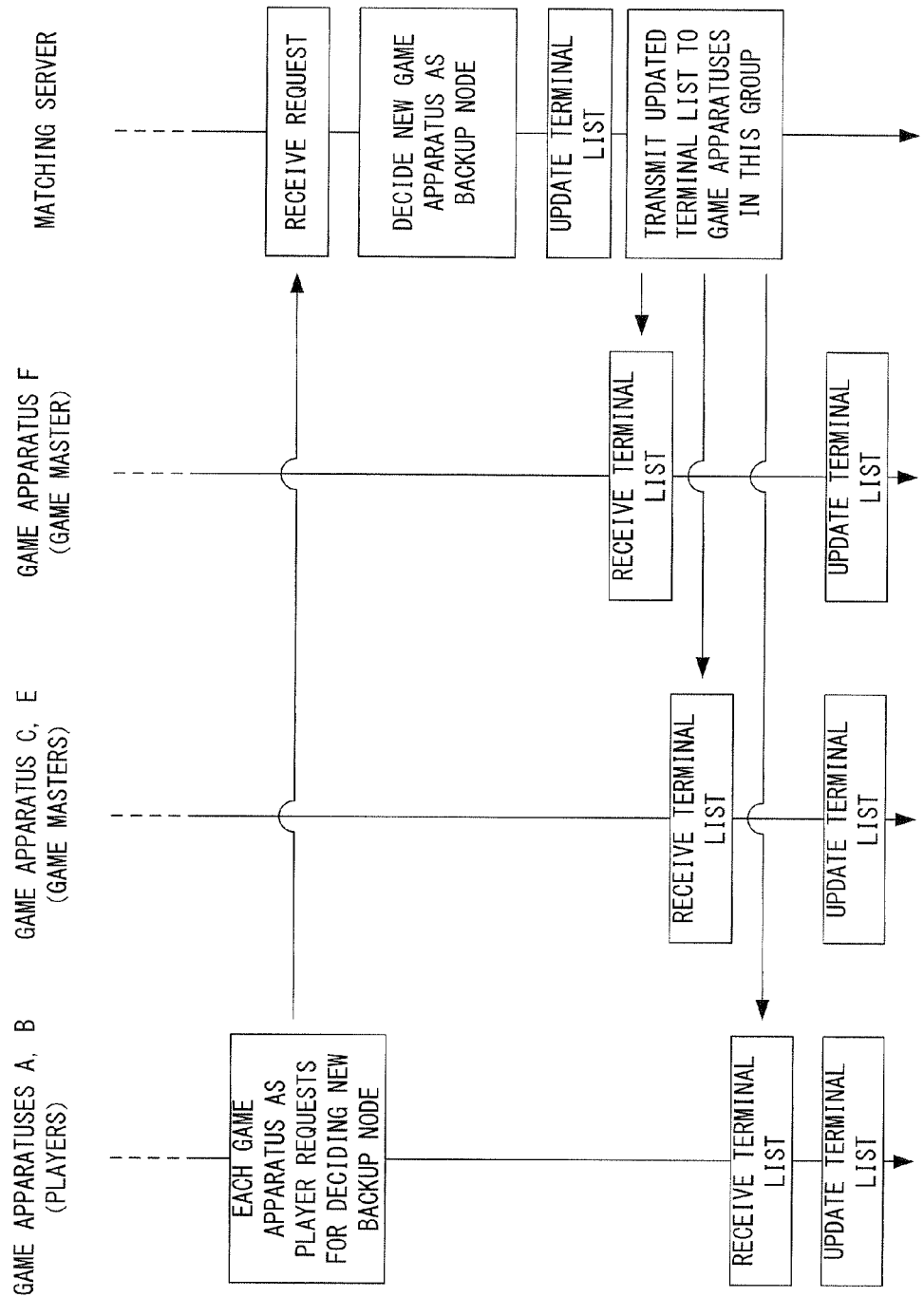
FIG. 9 shows an example non-limiting sequel to the rough flows of the processing by the game apparatuses as players, the game apparatuses as game masters, a game apparatus as a backup node and the matching server in a case that the a backup node is promoted and decided.

Furthermore, when each of game apparatuses A, B as players notifies the game apparatuses C, E as game masters with which the connection is not disconnected of a promotion of the backup node, it request the matching server 16 to decide a new backup node as shown in FIG. 9. Here, the request contains a notification that the game apparatus D is disconnected. Accordingly, the matching server 16 can know that the game apparatus D leaves the group including the game apparatus A and the game apparatus B.

When the matching server 16 receives the request to decide a new backup node, a new game apparatus 12 as a backup node (game apparatus G, here) is decided. The matching (deciding) method is the same as the matching (deciding) method of the game apparatus 12 as a game master (backup node) as described above. The matching server 16 updates the terminal list when deciding the new game apparatus G as a backup node. Here, the identification information, the connection information and the kind (game master) of the game apparatus D are erased. Furthermore, the kind of the game apparatus F is changed to the game master, and the identification information, the connection information and the kind (backup node) of the game apparatus G are additionally written. Thereafter, the matching server 16 transmits the updated terminal list to the respective game apparatuses 12 (game apparatuses A-C, E-G) in the group.

Each of the game apparatuses A-C, and E-G receives the terminal list association with the group, and updates the terminal list of the group. Accordingly, each of the game apparatuses A, B as players continues the communication game by communicating with the game apparatuses C, E, F as game masters. That is, in a case that the backup node is prepared, even if the game apparatus 12 as a game masters is disconnected (left), the communication game is neither terminated (forcibly terminated) nor restarted.

Figure 10:
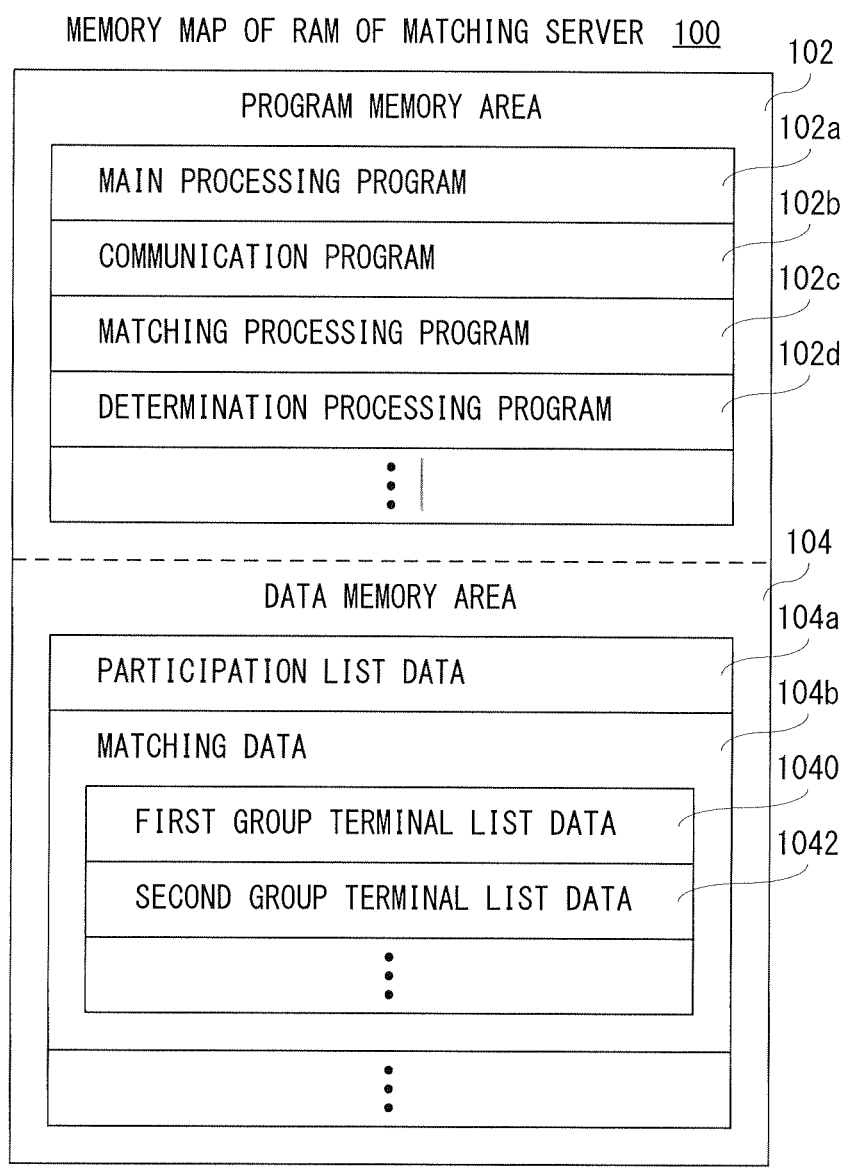
FIG. 10 shows an example non-limiting memory map of a RAM contained in the matching server shown in FIG. 1.

FIG. 10 shows one example of a memory map 100 of the RAM contained in the matching server 16. As shown in FIG. 10, the RAM contained in the matching server 16 includes a program memory area 102 and a data memory area 104. In the program memory area 102, an information processing program is stored, and the information processing program is made up of a main processing program 102a, a communication program 102b, a matching processing program 102c, a determination processing program 102d, etc.

The main processing program 102a is a program for processing a main routine of the matching server 16. The communication processing program 102b is a program for communicating with the devices and the computers, such as the game apparatus 12, the decoding server 18, the encoding server 20, etc. directly or via the network 14.

The matching processing program 102c is a program for deciding or performing a matching (grouping) of game apparatuses 12 as players, game apparatuses 12 as game masters and a game apparatus 12 as a backup node, and creating terminal list data for each group. The determination processing program 102d is a program for determining whether or not the game apparatus 12 being a source of a request to decode the encoded game data and to encode the game data is an authorized game master.

Although illustration is omitted, in the program memory area 102, a game program to be downloaded into the game apparatus 12, etc. is also stored.

In the data memory area 104, participant list data 104a, matching data 104b, etc. are stored. The participant list data 104a is data representing terminal information (identification information and connection information) of all the game apparatuses 12 from each of which a request to participate in the communication game is accepted in a list (table) form.

The matching data 104b is data storing the terminal list of the game apparatuses 12 that are decided as players, as game masters and as a backup node in a unit of a group. That is, the matching data 104b includes first group terminal list data 1040, second group terminal list data 1042, ..., etc. Each terminal list data (1040, 1042, ...) is data on a list (table) in which terminal information of each game apparatus 12 included in the group is described with decided (matched) information (discrimination among a player, a game master and backup node).

Although illustration is omitted, in the data memory area 104, other data necessary for execution of the information processing program are stored, and timers (counters) and flags are provided.

Figure 11:
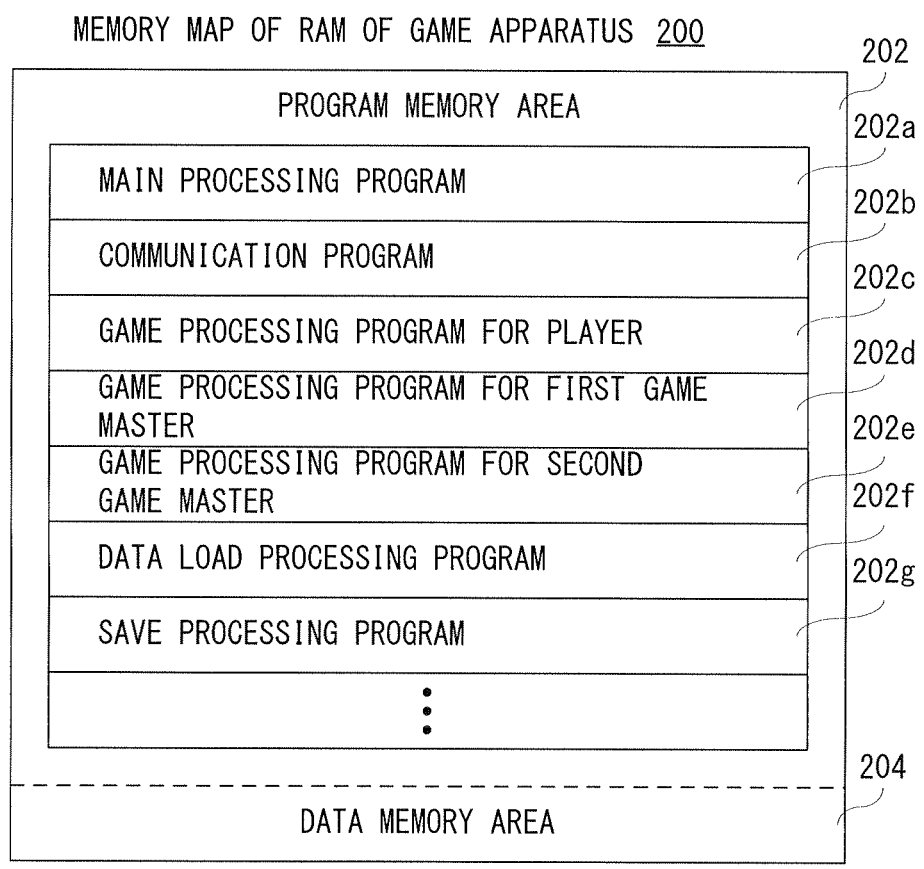
FIG. 11 shows an example non-limiting memory map of a RAM contained in the game apparatus shown in FIG. 2.
Figure 12:
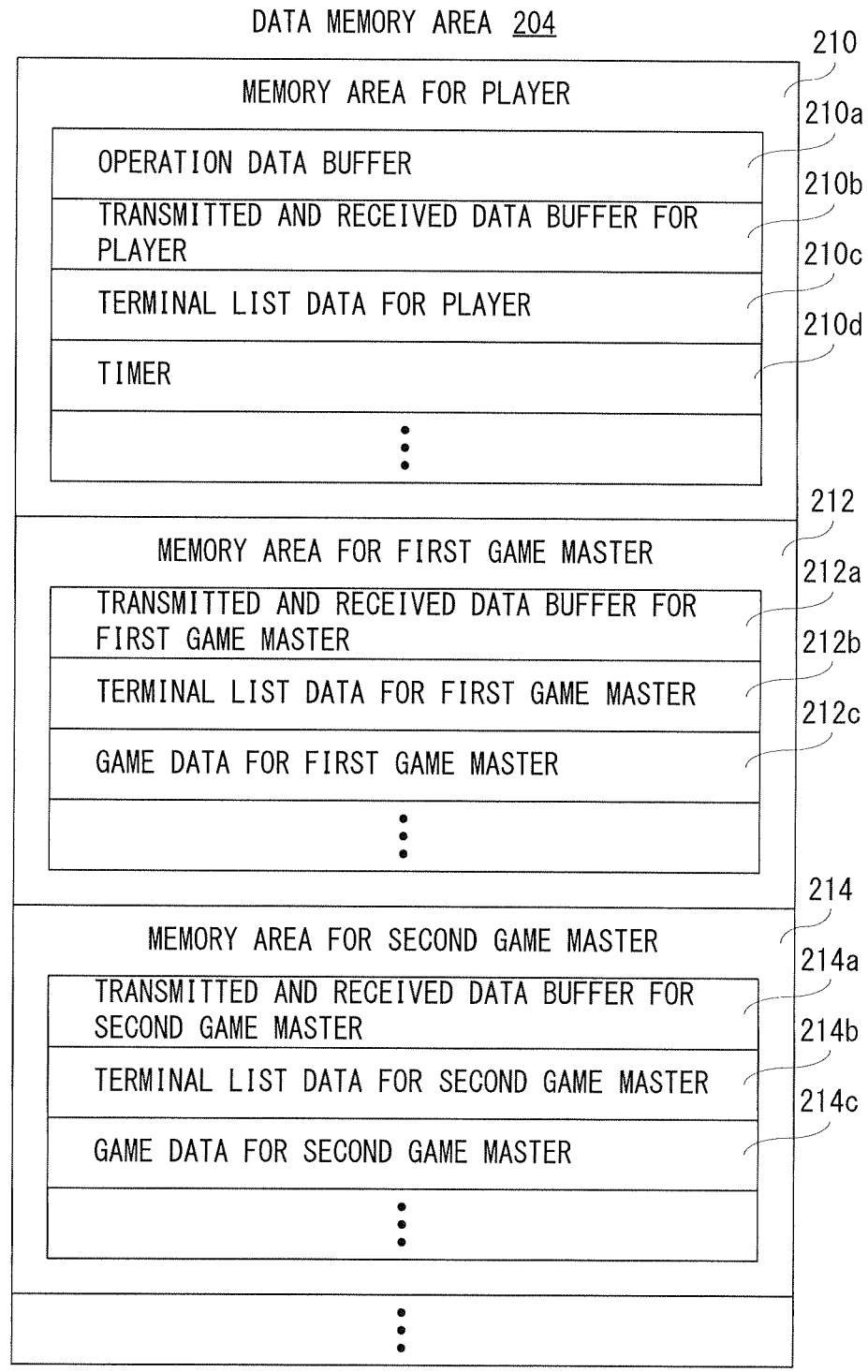
FIG. 12 shows an example non-limiting detailed contents of the data memory area shown in FIG. 11.

FIG. 11 and FIG. 12 show one example of a memory map 200 of the RAM 32 contained in the game apparatus 12 shown in FIG. 2. As shown in FIG. 11, the RAM 32 includes a program memory area 202 and a data memory area 204. The program memory area 202 stores a game program, and the game program is made up of a main processing program 202a, a communication program 202b, a game processing program for player 202c, a game processing program for first game master 202d, a game processing program for second game master 202e, a data loading processing program 202f and save processing program 202g, etc.

It should be noted that the game program is loaded from the flash memory 34, downloaded from computers or servers that are connected via the network 14, or loaded from a storage medium, such as a game cartridge, an SD card, etc.

The main processing program 202a is a program for processing a main routine of the communication game. The communication program 202b is a program for communicating with other game apparatuses (12) and computers directly or via the network 14.

The game processing program for player 202c is a game processing program in a case that the game apparatus 12 functions as a player, and mainly advances the communication game by depicting and displaying game images and generating and outputting game sounds on the basis of result data from the game master.

The game processing program for first game master 202d is a game processing program in a case that the game apparatus 12 functions as a first game master, and mainly executes the game processing by using game data (game data for first game master 212c described later) on the basis of the operation data from the respective game apparatuses 12 as players in the group in which the game apparatus participates as a first game master.

The game processing program for second game master 202e is a game processing program in a case that the game apparatus 12 functions as a second game master, and mainly executes the game processing by using game data (game data for second game master 214c described later) on the basis of the operation data from the respective game apparatuses 12 as players in the group in which the game apparatus participates as a second game master.

The data loading processing program 202f is a program for executing data loading processing in a case that the game apparatus functions as a player, and in a case that the game apparatus functions as a game master. More specifically, in a case that the game apparatus 12 functions as a player, the data loading processing program 202f requests each game apparatus 12 as a game master to load data prior to the start of the communication game. Furthermore, in a case that the game apparatus 12 functions as a game master, the data loading processing program 202f requests the decoding server 18 to decode the encoded game data in response to a request to load data from the game apparatus 12 as a player, and stores the game data (game data for first game master 212c, game data for second game master 214c) decoded by the decoding server 18 in response thereto in the data memory area 204.

The save processing program 202g is a program for executing save processing in a case that the game apparatus functions as a player, and in a case that the game apparatus functions as a game master. More specifically, in a case that the game apparatus 12 functions as a player, the save processing program 202g requests each of all the game apparatuses 12 as game masters to save data in response to occurrence of a predetermined event, according to an instruction by the player or the game end, receives the encoded game data from each of the game apparatuses 12 as game masters in response thereto, and stores (saves) the encoded game data being identical in the flash memory 34. Furthermore, in a case that the game apparatus 12 functions as a game master, the save processing program 202g requests the encoding server 20 to encode the game data if a request to save data is issued from the game apparatus 12 as a player, receives the encoded game data transmitted from the encoding server 20 in response thereto, and transmits it to the game apparatus 12 as a player being a source of request to save data.

Although illustration is omitted, in the program memory area 202, an image displaying program, a sound output program, etc. are also stored.

As shown in FIG. 12, the data memory area 204 further includes a memory area for player 210, a memory area for first game master 212 and a memory area for second game master 214.

The memory area for player 210 is provided with an operation data buffer 210a and a transmitted and received data buffer for player 210b. The operation data buffer 210a stores operation data from the input device 38. The transmitted and received data buffer for player 210b stores data to be transmitted and received to and from the game apparatuses 12 as game masters and the matching server 16.

Furthermore, in the memory area for player 210, terminal list data for player 210c is stored. The terminal list data for player 210c is data on the terminal list as to a group in which the game apparatus 12 participates as a player.

Also, in the memory area for player 210, a timer 210d is provided. The timer 210d is used to count a predetermined time (10 sec., for example) for determining whether or not a connection with the game apparatus 12 as a game master is disconnected.

Although illustration is omitted, in the memory area for player 210, other data necessary when the game apparatus 12 functions as a game apparatus 12 as a player is stored, and other timers (counters) and flags are provided.

In the memory area for first game master 212, a transmitted and received data buffer for first game master 212a is provided. The transmitted and received data buffer for first game master 212a stores data to be transmitted and received to and from the game apparatuses 12 as players, the matching server 16, the decoding server 18 and the encoding server 20 in a case that the game apparatus 12 functions as a first game master.

Furthermore, in the memory area for first game master 212, terminal list data for first game master 212b and game data for first game master 212c are stored. The terminal list data for first game master 212*b* is data on the terminal list about a group in which the game apparatus 12 is decided as a first game master. The game data for first game master 212*c* is game data of each game apparatus 12 as a player in the group in which the game apparatus 12 is decided as a first game master. In this embodiment, the game apparatus 12 as a player is two, and thus, in the game data for first game master 212*c*, two kinds of game data (corresponding to the aforementioned game data A and game data B) are included. This holds true for game data for second game master 214*c* described later.

Although illustration is omitted, in the memory area for first game master 212, other data necessary when the game apparatus 12 functions as a game apparatus 12 as a first game master, and other timers (counters) and flags are provided.

In the memory area for second game master 214, a transmitted and received data buffer for second game master 214*a* is provided. The transmitted and received data buffer for second game master 214*a* stores data to be transmitted and received to and from the game apparatuses 12 as players, the matching server 16, the decoding server 18 and the encoding server 20 in a case that the game apparatus 12 functions as a second game master.

Also, in the memory area for second game master 214, terminal list data for second game master 214*b* and game data for second game master 214*c* are stored. The terminal list data for second game master 214*b* is data on the terminal list about a group in which the game apparatus 12 is decided as a second game master. The game data for second game master 214*c* is game data of each game apparatus 12 as a player in the group in which the game apparatus 12 is decided as a second game master.

Although illustration is omitted, in the memory area for second game master 214, other data necessary when the game apparatus 12 functions as a game apparatus 12 as a second game master, and other timers (counters) and flags are provided.

Hereafter, the detailed processing to be executed in the game apparatus 12, the matching server 16, the decoding server 18, and the encoding server 20 is described.

Figure 13:
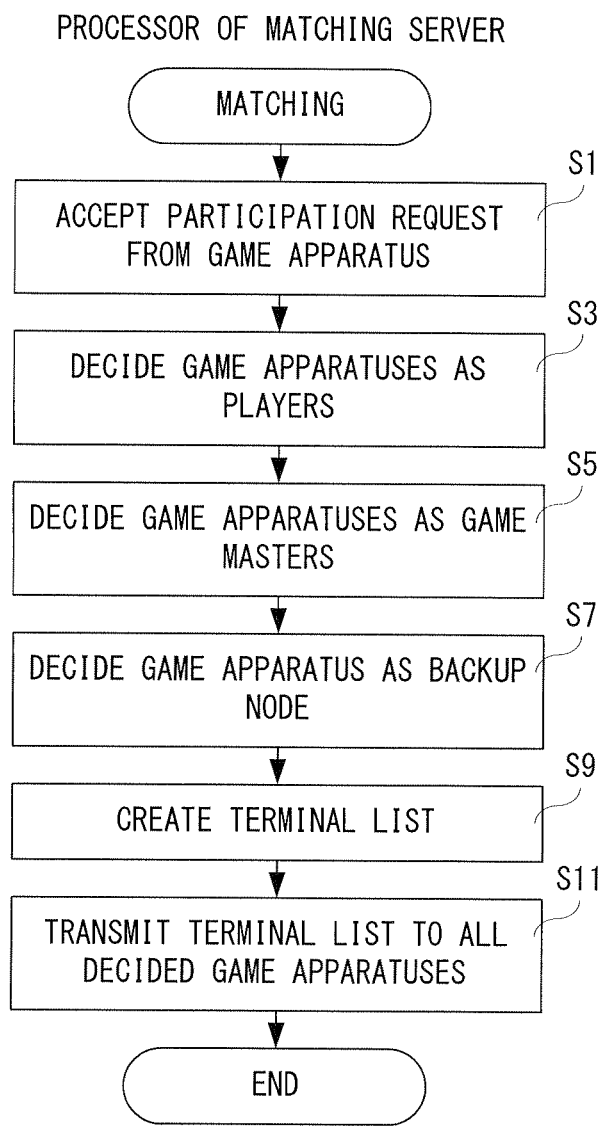
FIG. 13 shows an example non-limiting flowchart showing matching processing by a processor of the matching server.
Figure 14:
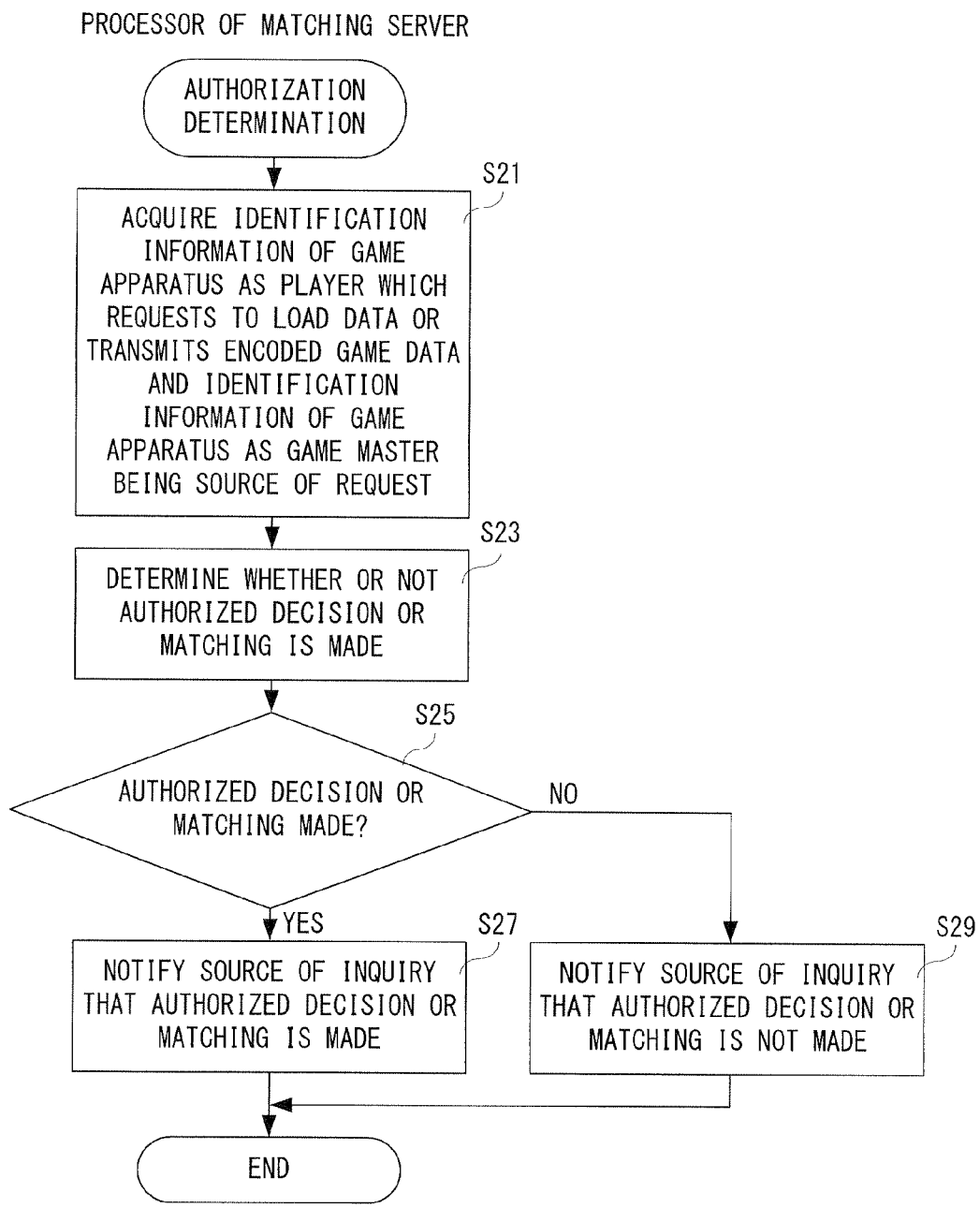
FIG. 14 shows an example non-limiting flowchart showing authorization determining processing by the processor of the matching server.
Figure 15:
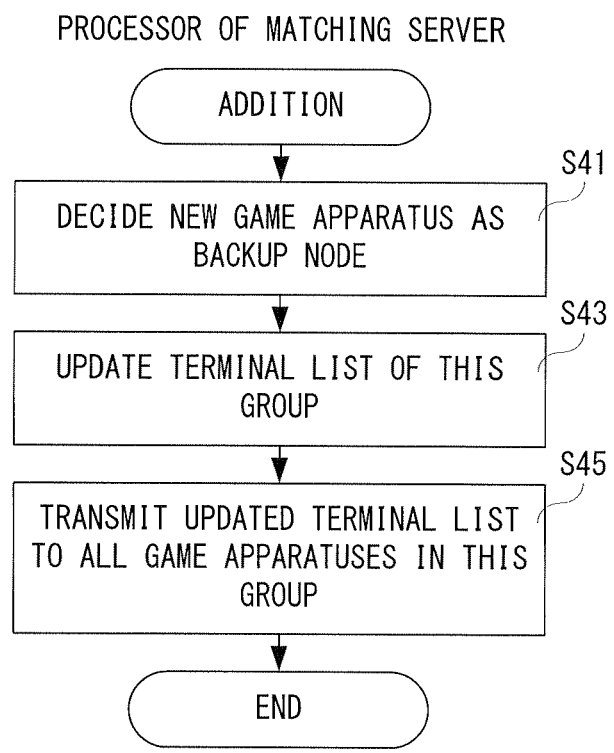
FIG. 15 shows an example non-limiting flowchart showing backup processing by the processor of the matching server.

FIG. 13, FIG. 14 and FIG. 15 respectively show matching processing, authorization determining processing and addition processing by the processor of the matching server 16. Each processing is executed according to a different task. The matching processing shown in FIG. 13 is executed for each predetermined time (10 minutes, for example), for example, and the authorization determining processing shown in FIG. 14 and the addition processing shown in FIG. 15 are executed in response to a request from the game apparatus 12. Accordingly, if a request from the game apparatus 12 is issued, the task is activated (executed) for each request.

FIG. 13 is a flowchart showing one example of the matching processing by the processor of the matching server. As shown in FIG. 13, when starting the matching processing, the processor of the matching server 16 accepts a participation request from the game apparatus 12 in a step S1. Although detailed description is omitted, the participation request from the game apparatus 12 includes the identification information and the connection information of the game apparatus 12.

In a next step S3, two game apparatuses 12 as players are decided (subject to matching) from the game apparatuses 12 from each of which the participation request is issued (may be referred to as being subject to matching in this embodiment). Succeedingly, in a step S5, three game apparatuses 12 as game masters are decided. In addition, in a step S7, the game apparatus 12 as a backup node is decided.

In a successive step S9, a terminal list is created. That is, the processor of the matching server 16 creates the terminal list about a group being made up of the two game apparatuses 12 as players decided in the step S3, the three game apparatuses 12 as game masters decided in the step S5, and one game apparatus 12 as a backup node decided in the step S7. Next, in a step S11, the terminal list is transmitted to all the decided (matched) game apparatuses 12, and the matching processing is ended.

Meanwhile, when the processor of the matching server 16 receives a request for determination processing from the decoding server 18 or the encoding server 20, it starts the authorization determining processing as shown in FIG. 14, and acquires identification information (player terminal information) of the game apparatus 12 as a player which requests to load data or transmits the encoded game data and the identification information (source of the request for decoding terminal information or source of the request for encoding terminal information) of the game apparatus 12 as a game master being the source of the request in a step S21. In a next step S23, it is determined whether or not an authorized decision or matching is made. That is, the processor of the matching server 16 determines whether or not the identification information of the game apparatus 12 as a player and the identification information of the game apparatus 12 as a game master being the source of the request that are acquired in the step S21 belong to the same group, and the player and the game master are authorizedly decided, with reference to the matching data 104*b*.

In a succeeding step S25, it is determined whether or not an authorized decision or matching is made. If "YES" in the step S25, that is, if an authorized decision or matching is made, the matching server 16 notifies the decoding server 18 or the encoding server 20 being the source of the inquiry that the authorized decision or matching is made in a step S27, and the authorization determining processing is ended. On the other hand, if "NO" in the step S25, that is, if an authorized decision or matching is not made, the matching server 16 notifies the decoding server 18 or the encoding server 20 being the source of the request that an authorized decision or matching is not made in a step S29, and the authorization determining processing is ended.

Furthermore, when the processor of the matching server 16 receives a request to decide a new backup node from the game apparatus 12 as a player, it starts the addition processing shown in FIG. 15 to decide a new game apparatus 12 as a backup node in a step S41.

It should be noted that in the request to decide the backup node, the identification information of the game apparatus 12 which disconnects the connections is included as described above.

In a next step S43, the terminal list of this group is updated. As described above, with respect to the terminal list, the processor of the matching server 16 erases the identification information, the connection information and the kind of the game apparatus 12 which disconnects the connection, changes the kind of the game apparatus 12 as a backup node (game apparatus F) from the backup node to the game master, and adds the identification information, the connection information and kind (backup node) of the game apparatus 12 (game apparatus G) decided in the step S41 thereto.

Then, in a step S45, the updated terminal list is transmitted to all the game apparatuses 12 in this group. Accordingly, in the processing by the game apparatus 12 described later, the terminal list is updated, and according to the updated terminal list, the game apparatuses 12 as players and the game apparatuses 12 as game masters communicate with each other to thereby advance the communication game thereafter.

Figure 16:
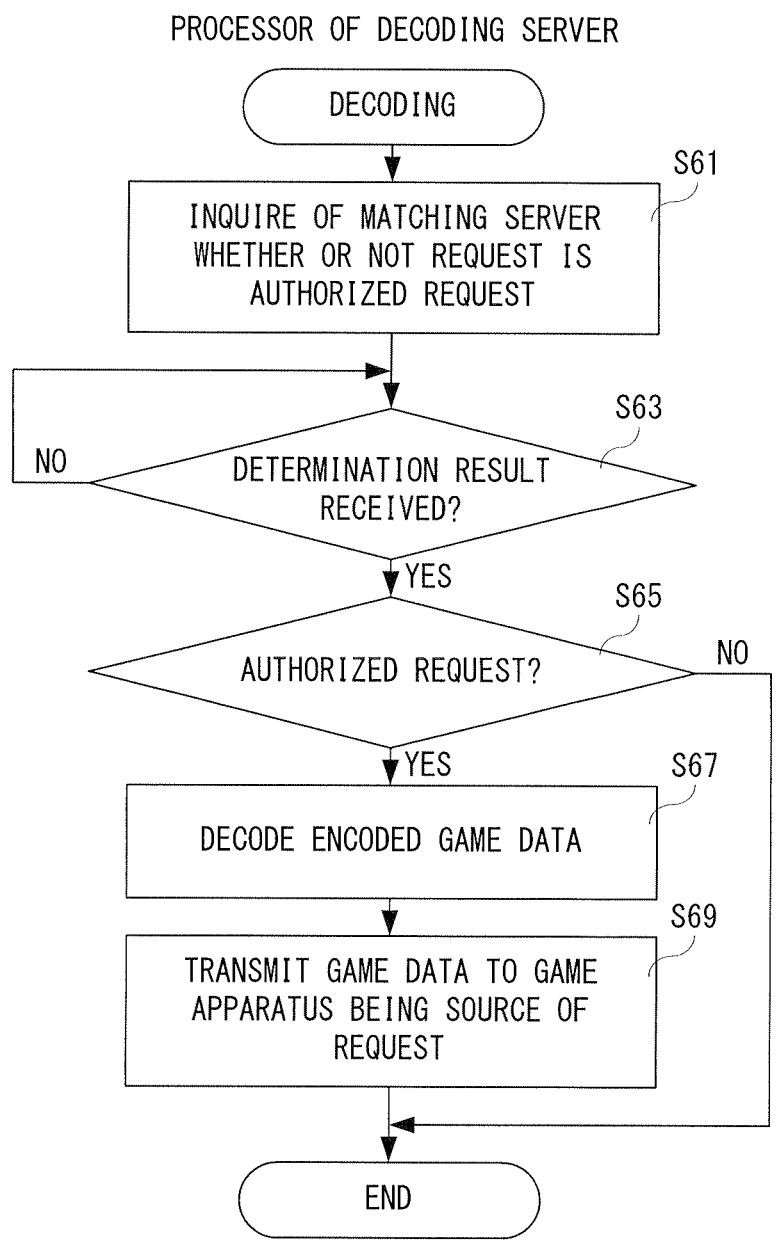
FIG. 16 shows an example non-limiting flowchart showing decoding processing by a processor of the decoding server.

FIG. 16 is a flowchart showing decoding processing by the processor of the decoding server 18. When receiving a request for decoding together with the encoded game data from the game apparatus 12 as a player, the processor of the decoding server 18 starts the decoding processing, and inquires of the matching server 16 whether the request is an authorized request in a step S61.

In a succeeding step S63, it is determined whether or not the determination result is received from the matching server 16. If "NO" in the step S63, that is, if the determination result from the matching server 16 is not received, the process returns to the same step S63. That is, the processor of the decoding server 18 waits for reception of the determination result. On the other hand, if "YES" in the step S63, that is, if the determination result from the matching server 16 is received, it is determined whether an authorized request or not in a step S65. That is, the processor of the decoding server 18 determines whether or not the received determination result indicates an authorized request.

If "NO" in the step S65, that is, if the result does not indicate the authorized request, the decoding processing is ended as it is. That is, the encoded game data is not decoded, and thus, raw game data is never transmitted to the game apparatus 12 that is not authorizedly decided (is not authorizedly subject to matching). On the other hand, if "YES" in the step S65, that is, if the result indicates the authorized request, the encoded game data is decoded in a step S67, the game data is transmitted to the game apparatus 12 as a game master being a source of the request for decoding in a step S69, and then, the decoding processing is ended.

As described above, the request for decoding is transmitted from all the game apparatuses 12 as game masters in each group, and therefore, such the decoding processing is executed every decoding request. Accordingly, in a case that the requests for decoding are received around the same time, respective decoding process is executed in parallel.

Figure 17:
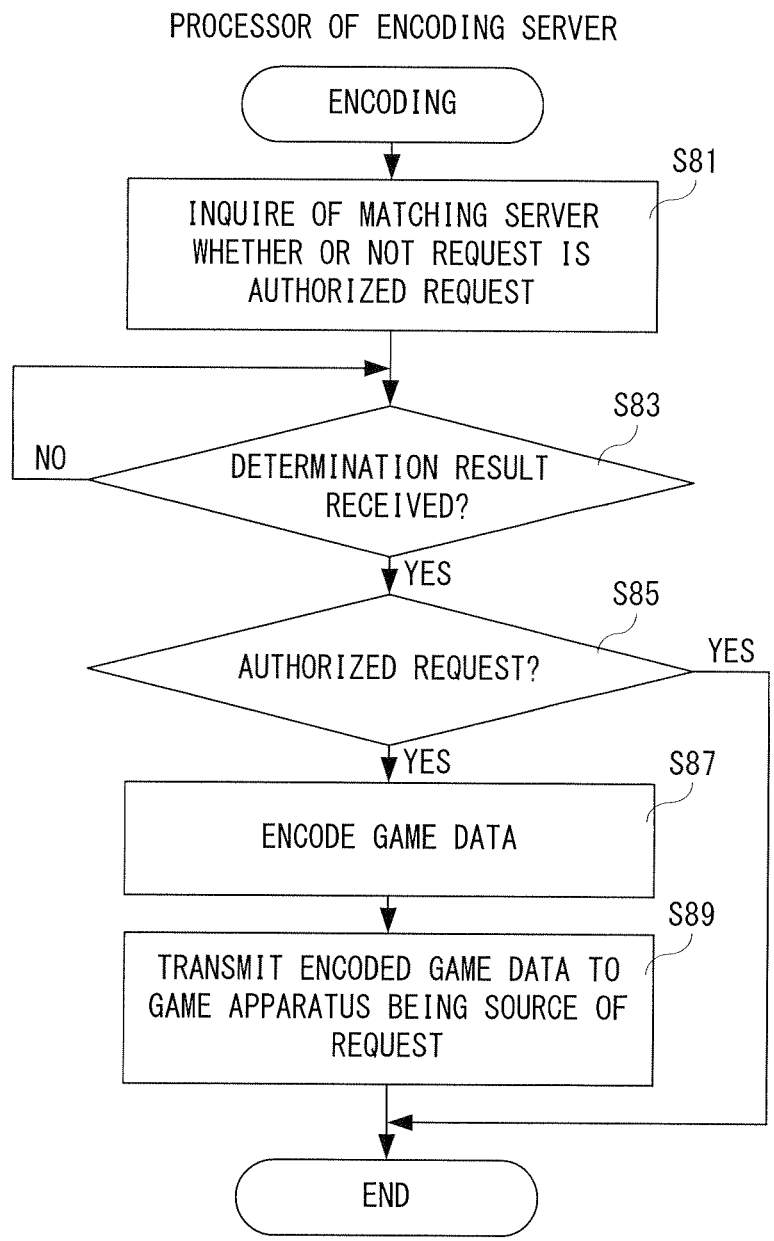
FIG. 17 shows an example non-limiting flowchart showing encoding processing by a processor of the encoding server.

FIG. 17 is a flowchart showing encoding processing by the processor of the encoding server 20. When receiving a request for encoding together with the game data from the game apparatus 12 as a game master, the processor of the encoding server 20 starts the encoding processing, and inquires of the matching server 16 whether or not the request is an authorized request in a step S81.

In a succeeding step S83, it is determined whether or not the determination result is received from the matching server 16. If "NO" in the step S83, that is, if the determination result from the matching server 16 is not received, the process returns to the same step S83. That is, the processor of the encoding server 20 waits for reception of the determination result. On the other hand, if "YES" in the step S83, that is, if the determination result from the matching server 16 is received, it is determined whether an authorized request or not in a step S85. That is, the processor of the encoding server 20 determines whether or not the received reception result indicates an authorized request.

If "NO" in the step S85, that is, if the result does not indicate the authorized request, the encoding processing is ended as it is. That is, the game data is not encoded, and thus, the encoded game data is never transmitted to the game apparatus 12 that is not authorizedly decided (is not authorizedly subject to matching). On the other hand, if "YES" in the step S85, that is, if the result indicates the authorized request, the game data is encoded in a step S87, the encoded game data is transmitted to the game apparatus 12 as a game master being the source of the request for encoding in a step S89, and the encoding processing is ended.

As described above, the request for encoding is transmitted from all the game apparatuses 12 as game masters in each group, and thus, such the encoding processing is executed every request for encoding. Accordingly, if the requests for encoding are issued around the same time, respective encoding processing is executed in parallel.

Figure 18:
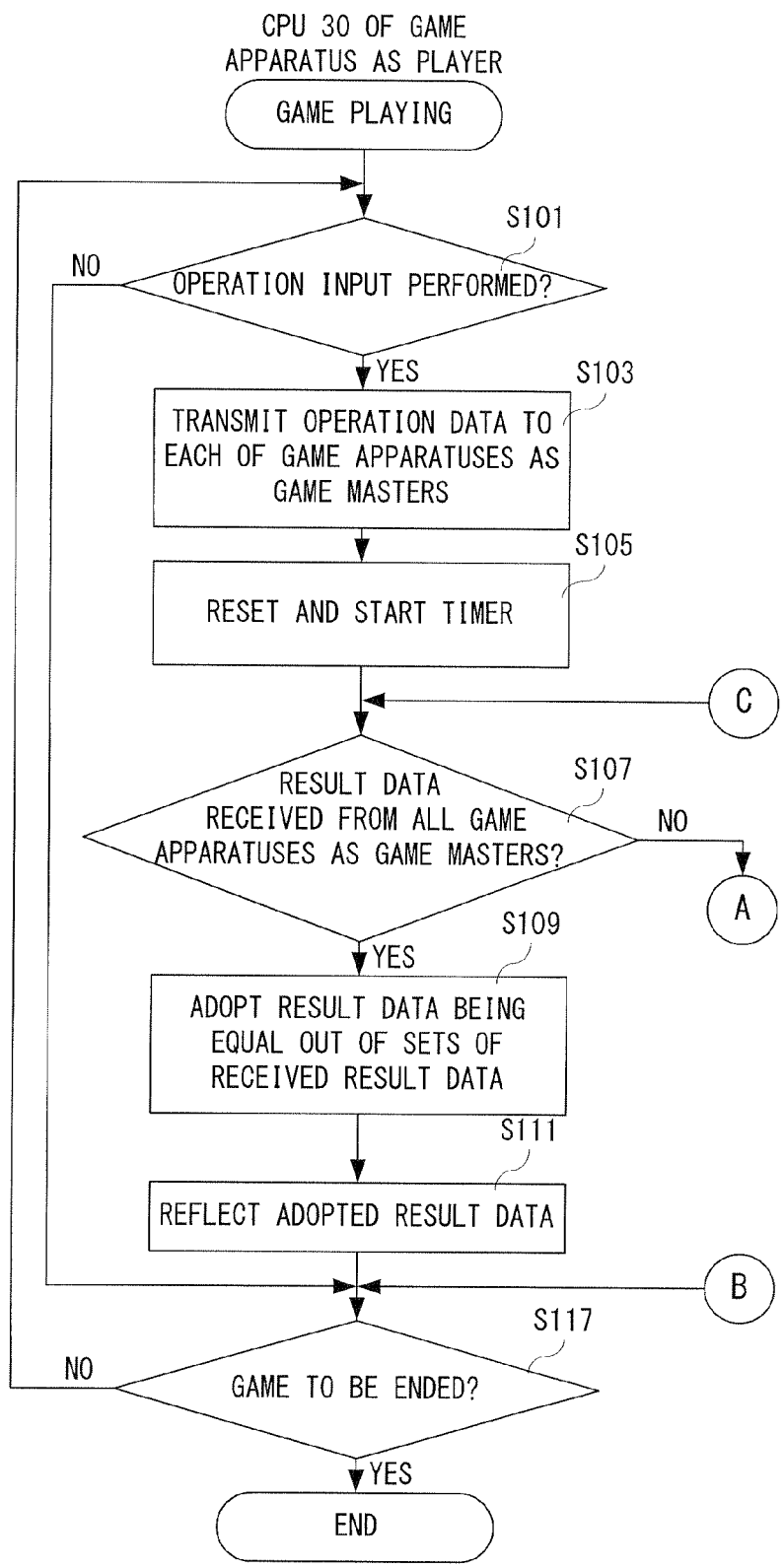
FIG. 18 shows an example non-limiting flowchart showing a part of game playing processing by the CPU of a game apparatus as a player.
Figure 19:
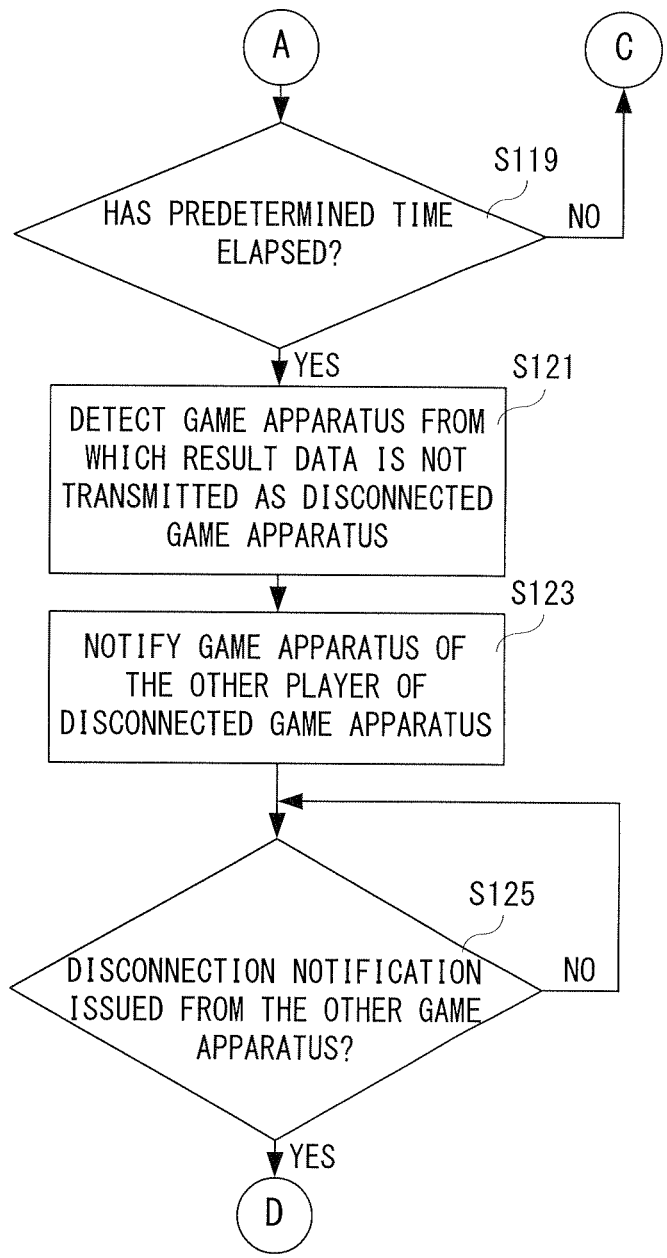
FIG. 19 shows an example non-limiting flowchart showing another part of the game playing processing by the CPU of the game apparatus as a player.
Figure 20:
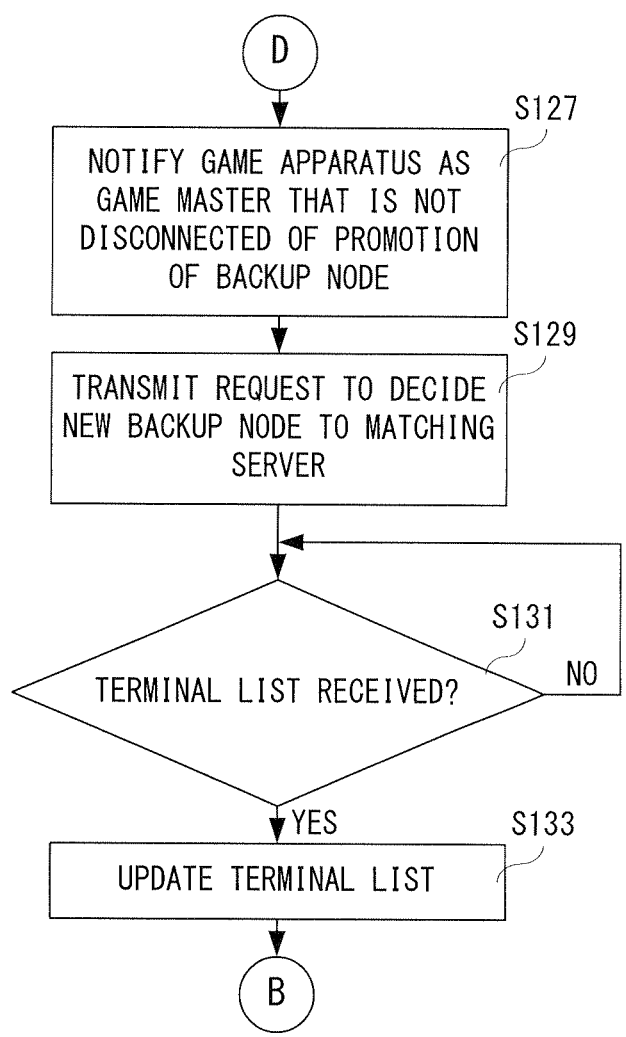
FIG. 20 shows an example non-limiting flowchart showing still another part of the game playing processing by the CPU of the game apparatus as a player.
Figure 21:
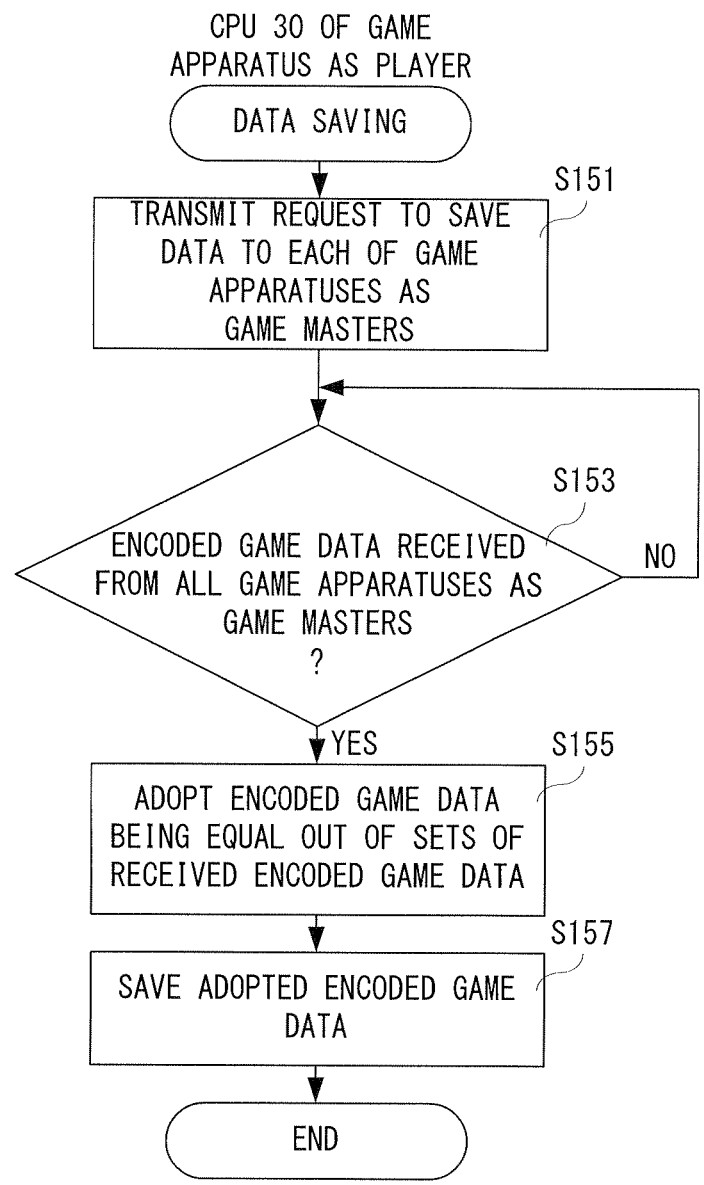
FIG. 21 shows an example non-limiting flowchart showing data saving processing by the CPU of the game apparatus as a player.
Figure 22:
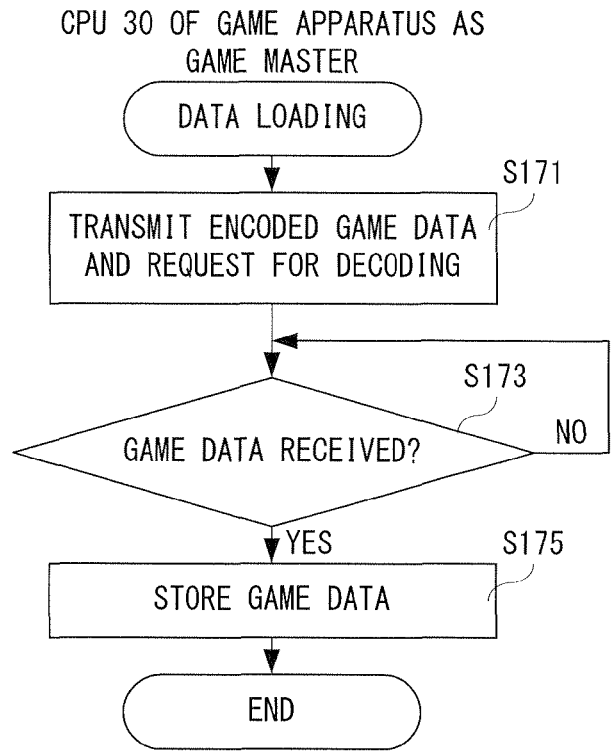
FIG. 22 shows an example non-limiting flowchart showing data loading processing by a CPU of a game apparatus as a game master.
Figure 23:
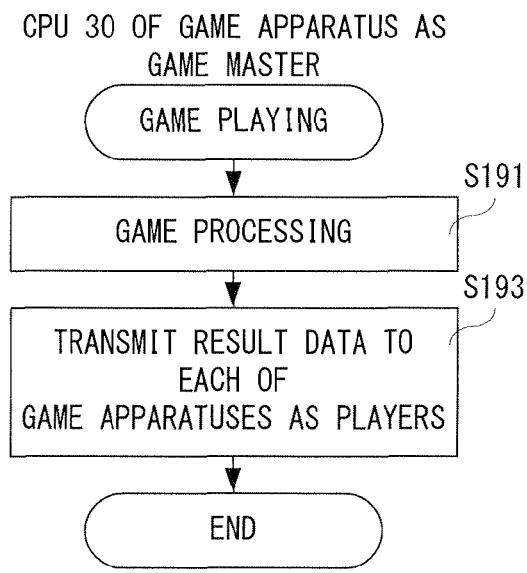
FIG. 23 shows an example non-limiting flowchart showing game playing processing by the CPU of the game apparatus as a game master.
Figure 24:
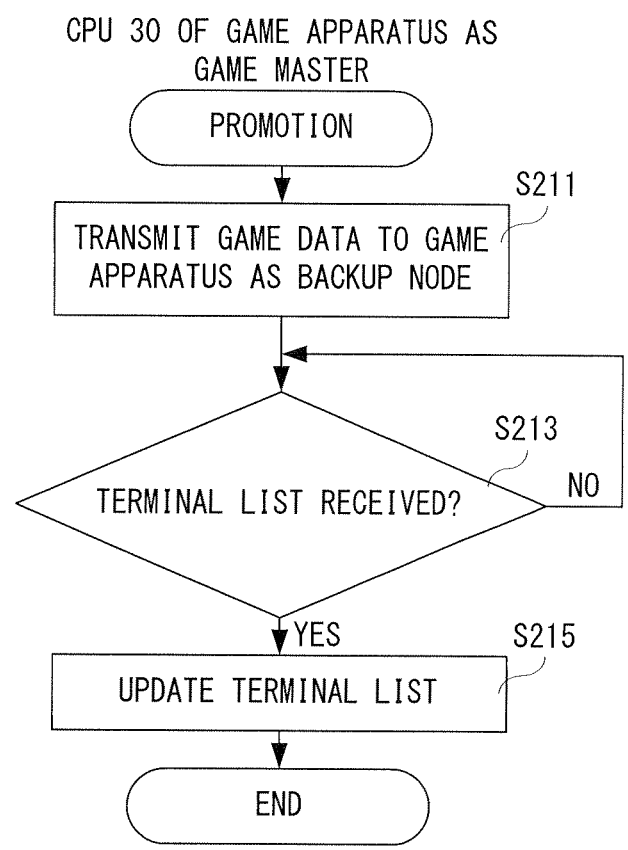
FIG. 24 shows an example non-limiting flowchart showing promotion processing by the CPU of the game apparatus as a game master.
Figure 25:
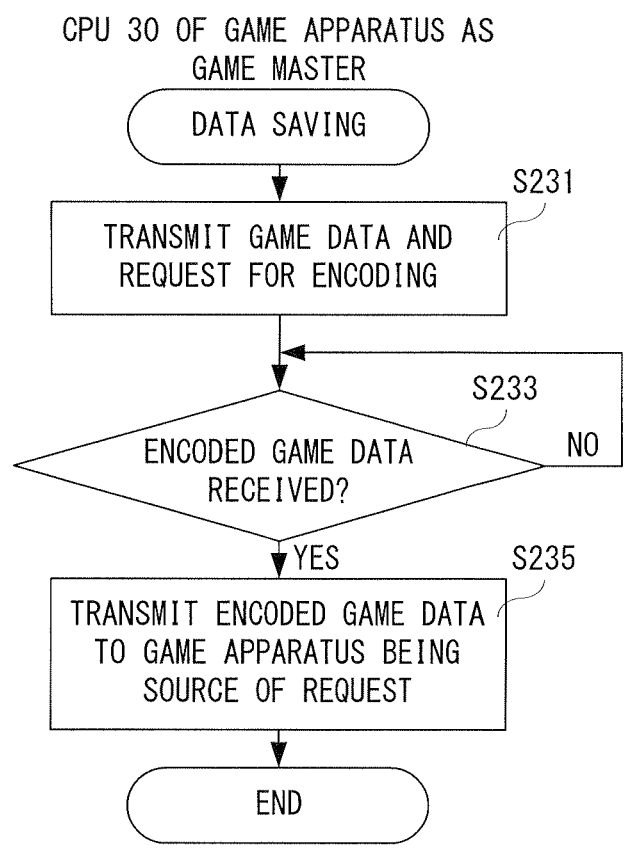
FIG. 25 shows an example non-limiting flowchart showing data saving processing by the CPU of the game apparatus as a game master.

FIG. 18 to FIG. 20 are flowcharts showing game playing processing by the CPU 30 of the game apparatus 12 as a player. FIG. 21 is a flowchart showing data saving processing by the CPU 30 of the game apparatus 12 as a player. FIG. 22 is a flowchart showing data loading processing by the CPU 30 of the game apparatus 12 as a game master. FIG. 23 is a flowchart showing the game playing processing by the CPU 30 of the game apparatus 12 as a game master. FIG. 24 is a flowchart showing addition processing by the CPU 30 of the game apparatus 12 as a game master. FIG. 25 is a flowchart showing data saving processing by the CPU 30 of the game apparatus 12 as a game master.

Hereafter, the description is made on the processing by the CPU 30 of the game apparatus 12 as a player and the processing by the CPU 30 of the game apparatus 12 as a game master that are included in one group. Here, as described above, one game apparatus 12 functions as a player in one group, and functions as a game master or a backup node in the other two groups. Thus, focusing on one game apparatus 12, each processing shown in FIG. 18 to FIG. 24 may be executed in the game apparatus 12. Also, in a case that the game apparatus 12 functions as a game master in the two groups, each processing shown in FIG. 22 to FIG. 25 is executed with respect to each of the two groups.

It should be noted that although the illustration in detail is omitted, the game apparatus 12 as a player executes the data loading processing for transmitting the encoded game data to each of the game apparatuses 12 as game masters prior to start of the communication game (game playing).

As shown in FIG. 18, when starting the game playing processing, the CPU 30 of the game apparatus 12 as a player determines whether or not an operation input is performed in a step S101. Here, the CPU 30 determines whether or not the operation data is stored in the operation data buffer 210*a*. If "NO" in the step S101, that is, if an operation input is not performed, the process proceeds to a step S117. On the other hand, if "YES" in the step S101, that is, if an operation input is performed, operation data is transmitted to each of the game apparatuses 12 as game masters in a step S103, and the timer 210*d* is reset and started in a step S105.

Succeedingly, in a step S107, it is determined whether or not result data is received from all the game apparatuses 12 as game masters. If "NO" in the step S107, that is, if the game apparatus 12 as a game master from which the result data is not transmitted exists, the process proceeds to a step S119 shown in FIG. 19. On the other hand, if "YES" in the step S107, that is, if the result data is received from all the game apparatuses 12 as game masters, the result data being identical is adopted in a step S109. Then, in a step S111, the adopted result data is reflected. That is, the CPU 30 advances the game by depicting game images and outputting (displaying) it to the display 42, and generating game sounds and outputting it to the speaker 46 based on the adopted result data.

Then, in the step S117, it is determined whether or not the game is to be ended. The CPU 30 determines whether or not a game end instruction is input, or the game is over in the step S117. If "NO" in the step S117, that is, if the game is not to be ended, the process returns to the step S101 as it is. On the other hand, if "YES" in the step S117, game playing processing is ended.

As described above, if the game apparatus 12 as a game master from which the result data is not transmitted exists, it is determined whether or not a predetermined time has elapsed in the step S119 shown in FIG. 19. That is, the CPU 30 determines whether or not the count value by the timer 210*d* is larger than a predetermined time. If "NO" in the step S119, that is, if the predetermined time has not elapsed, the process returns to the step S107 shown in FIG. 18 as it is. That is, the CPU 30 waits for reception of the result data.

On the other hand, if "YES" in the step S119, that is, if the predetermined time has elapsed, the game apparatus 12 from which the result data is not transmitted is detected as a disconnected game apparatus 12 in a step S121. In a next step S123, the disconnected game apparatus 12 is notified to the game apparatus 12 of the other player. Then, in a step S125, it is determined whether or not a disconnection notification is issued from the game apparatus 12 of the other player. If "NO" in the step S125, that is, if a disconnection notification is not issued from the game apparatus 12 of the other player, the process returns to the step S125 as it is.

It should be noted that in this embodiment, if a disconnection notification is not issued from the game apparatus 12 of the other player, the process returns to the step S125 as it is. However, if a disconnection notification is not issued even after a predetermined time (10 sec, for example) has elapsed, the game apparatus 12 that is disconnected may be detected accidentally, and therefore, the process may return to the step S107 for receiving the result data again. Or, the game apparatus 12 of the other player may be disconnected, and therefore, the game playing processing may be forcibly terminated.

On the hand, if "YES" in the step S125, that is, if the disconnection notification is issued from the game apparatus 12 of the other player, the game apparatus 12 as a game master that is not disconnected is notified of promotion of the backup node in a step S127 shown in FIG. 20. In a next step S129, a request to decide (perform matching on) the backup node is transmitted to the matching server 16. At this time, the CPU 30 also transmits the identification information of the disconnected game apparatus 12.

Then, in a step S131, it is determined whether or not the terminal list is received. If "NO" in the step S131, that is, if the terminal list is not received, the process returns to the same step S131. On the other hand, if "YES" in the step S131, that is, if the terminal list is received, the terminal list is updated in a step S133, and the process returns to the step S117 shown in FIG. 18. In the step S133, the terminal list indicated by the terminal list data for player 210*c* is replaced by the received terminal list.

FIG. 21 is a flowchart showing the data saving processing by the CPU 30 of the game apparatus 12 as a player. In response to occurrence of a predetermined event during the game, an input of an instruction by the player during the game, or an end of the game playing processing, the data saving processing is started.

When starting the data saving processing, the CPU 30 of the game apparatus 12 as a player transmits a request to save data to each of the game apparatuses 12 as game masters in a step S151 as shown in FIG. 21. In a next step S153, it is determined whether or not the encoded game data is received from all the game apparatuses 12 as game masters.

If "NO" in the step S153, that is, if the game apparatus 12 as a game master from which the encoded game data is not transmitted exists, the process returns to the step S153 as it is. On the other hand, if "YES" in the step S153, that is, if the encoded game data is received from all the game apparatuses 12 as game masters, the encoded game data being identical is adopted in a step S155, the adopted encoded game data is saved in the flash memory 34 in a step S157, and data saving processing is ended.

It should be noted that in this embodiment if "NO" in the step S153, the same processing in the step S153 is repeated as it is, but there is no need of being restricted thereto. In a case that the encoded game data is not received even after a lapse of a predetermined time, failure of saving data is notified, and the data saving processing may be forcibly terminated. Alternatively, similar to the case of the game playing, if the encoded game data is not received ever after a lapse of a predetermined time, the disconnection of the game apparatus 12 as a game master from which the encoded game data is not transmitted is detected, a backup node is promoted to the game master, and the data saving processing may be continued.

FIG. 22 is a flowchart showing data loading processing by the CPU 30 of the game apparatus 12 as a game master. Here, the description is made on a case that the game apparatus 12 functions as a first game master, but this holds true for a case that the game apparatus 12 functions as a second game master. As to the game playing processing and the data saving processing to be described later as well, the description is made on a case that the game apparatus 12 functions as a first game master.

When receiving a request to load data together with the encoded game data from the game apparatus 12 as a player, the CPU 30 of the game apparatus 12 as a game master starts the data loading processing, and transmits the encoded game data and the request for decoding to the decoding server 18 in a step S171 as shown in FIG. 22.

In a succeeding step S173, it is determined whether or not the game data is received. If "NO" in the step S173, that is, if the game data is not received, the process returns to the same step S173 as it is. On the other hand, if "YES" in the step S173, that is, if the game data is received, the game data is stored in a step S175, and the data loading processing is ended. That is, in the step S175, the CPU 30 stores as game data for first game master 212*c* the game data stored in the transmitted and received data buffer for first game master 212*a* provided to the memory area for first game master 212. Here, if the number of game apparatuses 12 as players is two, data loading processing is executed in response to a request from each of the game apparatuses 12 as players.

FIG. 23 is a flowchart showing the game playing processing by the CPU 30 of the game apparatus 12 as a game master. When receiving operation data from all the game apparatuses 12 as players, the CPU 30 of the game apparatus 12 as a game master starts the game playing processing, and executes the game processing in a step S191. At this time, the parameter corresponding to the game data for first game master 212*c* is used. Then, in a step S193, the result data is transmitted to each of the game apparatuses 12 as players, and the game playing processing is ended.

FIG. 24 is a flowchart showing the promotion processing by the CPU 30 of the game apparatus 12 as a game master. When receiving a promotion notification of the backup node from the game apparatus 12 as a player, the CPU 30 of the game apparatus 12 as a game master starts the promotion processing, and transmits the game data to the game apparatus 12 as a backup node in a step S211. It should be noted that the game data to be transmitted here is a copy of the game data for first game master 212*c*.

In a next step S213, it is determined whether or not the terminal list is received. If "NO" in the step S213, that is, if the terminal list is not received, the process returns to the same step S213 as it is. On the other hand, if "YES" in the step S213, that is, if the terminal list is received, the terminal list is updated in a step S215, and the promotion processing is ended. In the step S215, the terminal list indicated by the terminal list data for first game master 212*b* is replaced by the received terminal list.

FIG. 25 is a flowchart showing the data saving processing by the CPU 30 of the game apparatus 12 as a game master. When receiving a request to save data from the game apparatus 12 as a player, the CPU 30 of the game apparatus 12 as a game master starts the data saving processing, and transmits the game data and the request for encoding to the encoding server 20 in a step S231.

In a next step S233, it is determined whether or not the encoded game data is received. If "NO" in the step S233, that is, if the encoded game data is not received, the process returns to the same step S233 as it is. On the other hand, if "YES" in the step S233, that is, if the encoded game data is received, the encoded game data is transmitted to the game apparatus 12 as a player being the source of the request to save data in a step S235, and the data saving processing is ended.

According to the present embodiment, the game apparatus can participate in a certain communication game as a game player while it can participate in another communication game as a game master. At least, game apparatuses as players and game apparatuses as game masters are decided, and the game playing processing is executed among the decided game apparatuses, and therefore, it is possible to distribute a processing load without preparation of a game server.

Also, according to the present embodiment, game data is stored in each of the game apparatus as a game master different from each of the game apparatus as a player. When the game apparatus as a game master receives operation data from the game apparatus as a player, it executes game processing by using the parameters corresponding to the game data, and transmits the result to the game apparatus as a player. Thus, the game data is not stored in the game apparatus as a player, and therefore, it is possible to prevent the game data being modified as much as possible without provision of a game server.

In addition, according to the present embodiment, the data to be saved in the game apparatus is encoded game data, and thus, even if the encoded game data is modified or tampered, this cannot be decoded in the decoding server. Therefore, the game processing using the modified game data is never executed.

It should be noted that in this embodiment, three game apparatuses are decided as game masters, but the number of game apparatuses as game masters may be one or two. Or, if the game apparatus has a capability, four or more game apparatuses as game masters can be decided. Here, if the number of game apparatuses as game masters is one, each of the game apparatuses as players merely acquires the result data and the encoded game data from the game apparatus as a game master. Furthermore, if the number of game apparatuses as game masters is two, only when the result data and the encoded game data from these game apparatuses as game masters are equal, the game apparatus as a player adopts the result data and the encoded data. In addition, in a case that the number of game apparatuses as game masters is an even number being equal to or more than four, if the number of game apparatuses that are equal in contents of the result data and the game data and that are not equal in contents thereof is the same, the equal one may be adopted or not adopted.

Furthermore, in this embodiment, the description is made only on portable game apparatuses, but this can be applied to other kinds of portable information processing apparatuses having a communication function, such as a notebook PC, a PDA, a cellular phone, or the like. Also, this can be applied to nonportable information processing apparatuses, such as a desktop PC, a console game apparatus, or the like.

In addition, in this embodiment, the matching server, the decoding server and the encoding server are provided separately, but one or two servers having two or more functions may be provided.

Moreover, in this embodiment, encoding of the game data is performed in the encoding server, and decoding of the encoded game data is performed in the decoding server, but encoding and decoding may be performed in game apparatuses as game masters. The game apparatus of the user becomes a game master without noticing of it by the user, and therefore, even if encoding or decoding is performed in this game apparatus, the possibility of an illegal act occurring in the game apparatus becomes low.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A game system, including a first game apparatus, a second game apparatus and a third game apparatus that are configured to communicate with each other on a network, in which a first communication game is played between said first game apparatus and said second game apparatus, wherein said first game apparatus comprises a first input data transmitter which transmits in response to an input by a first user first input data corresponding to the input, to said third game apparatus;

said second game apparatus comprises a second input data transmitter which transmits in response to an input by a second user second input data corresponding to the input, to said third game apparatus; and said third game apparatus not playing said first communication game comprises a first game processing executer which executes game processing of said first communication game on the basis of the first input data transmitted by said first input data transmitter and the second input data transmitted by said second input data transmitter, wherein the first game apparatus, the second game apparatus, and the third game apparatus are of the same type, wherein the game system further comprises a first decider which selects game apparatuses less than all of a plurality of game apparatuses communicating on the network by selecting a group including said first game apparatus, said second game apparatus and said third game apparatus from at least four game apparatuses communicating on the network, wherein the game system further comprises a plurality of third game apparatuses, and wherein each of said plurality of third game apparatuses further includes a result data transmitter which transmits result data of the game processing of said first communication game executed by said first game processing executer to said first game apparatus and said second game apparatus, each of said first and second game apparatuses further comprises a result data receiver which receives a plurality of sets of result data transmitted by said result data transmitter of said plurality of third game apparatuses, and an output controller which causes an output device to output selected result data from said plurality of sets of the result data received by said result data receiver.

2. A game system according to claim 1, further comprising a fourth game apparatus configured to communicate with at least said third game apparatus, wherein
said first decider which decides another group different from said group including at least said third game apparatus and said fourth game apparatus, and
said third game apparatus plays a second communication game with said fourth game apparatus being different from said first game apparatus and said second game apparatus in a case that said game processing of said first communication game is executed by said first game processing executer.

3. A game system according to claim 1, further comprising a fifth game apparatus and a sixth game apparatus configured to communicate with at least said first game apparatus, wherein a third communication game is played between said fifth game apparatus and said sixth game apparatus,
said fifth game apparatus comprises a third input data transmitter which transmits in response to an input by a third user third input data corresponding to the input, to said first game apparatus,
said sixth game apparatus comprises a fourth input data transmitter which transmits in response to an input by a fourth user fourth input data corresponding to the input, to said first game apparatus,
said first game apparatus not playing at least said third communication game further comprises a second game processing executer which executes game processing of said third communication game on the basis of the third input data transmitted by said third input data transmitter and the fourth input data transmitted by said fourth input data transmitter.

4. A game system according to claim 1, further comprising at least three said third game apparatuses, wherein
said output controller compares said plurality of sets of the result data received by said result data receiver, and outputs as the selected result data a set of said result data which is identical to the largest number of others of said result data, from said plurality of sets of the result data.

5. A game system according to claim 1, further comprising a seventh game apparatus being a reserve of said third game apparatus, wherein
said seventh game apparatus further comprises a reserve game processing executer which executes the game processing of said first communication game on the basis of the first input data transmitted by said first input data transmitter and the second input data transmitted by said second input data transmitter in place of said third game apparatus in a case that the connection with said third game apparatus is disconnected.

6. A game system according to claim 1, further comprising an encoding device configured to communicate with at least said third game apparatus, wherein
said third game apparatus further comprises a first game data transmitter which transmits to said encoding device the game data changed in correspondence with game processing of said first communication game executed by said first game processing executer,
said encoding device further comprises
an encoder which encodes the game data transmitted by said first game data transmitter, and
a first encoded data transmitter which transmits encoded game data encoded by said encoder to said third game apparatus, said third game apparatus further comprises a second encoded data transmitter which transmits the encoded game data transmitted by said first encoded data transmitter to said first game apparatus and said second game apparatus, and
each of said first and second game apparatuses further comprises a storage which stores the encoded game data transmitted by said second encoded data transmitter.

7. A game system, including a first game apparatus, a second game apparatus and a third game apparatus that are configured to communicate with each other on a network, in which a first communication game is played between said first game apparatus and said second game apparatus, wherein
said first game apparatus comprises a first input data transmitter which transmits in response to an input by a first user first input data corresponding to the input, to said third game apparatus;
said second game apparatus comprises a second input data transmitter which transmits in response to an input by a second user second input data corresponding to the input, to said third game apparatus; and
said third game apparatus not playing said first communication game comprises a first game processing executer which executes game processing of said first communication game on the basis of the first input data transmitted by said first input data transmitter and the second input data transmitted by said second input data transmitter, wherein the first game apparatus, the second game apparatus, and the third game apparatus are of the same type, wherein the game system further comprises a first decider which selects game apparatuses less than all of a plurality of game apparatuses communicating on the network by selecting a group including said first game apparatus, said second game apparatus and said third game apparatus from at least four game apparatuses communicating on the network;
wherein the game system further comprises an encoding device configured to communicate with at least said third game apparatus; wherein
said third game apparatus further comprises a first game data transmitter which transmits to said encoding device the game data changed in correspondence with game processing of said first communication game executed by said first game processing executer;
wherein said encoding device further comprises
an encoder which encodes the game data transmitted by said first game data transmitter, and
a first encoded data transmitter which transmits encoded game data encoded by said encoder to said third game apparatus;
wherein said third game apparatus further comprises a second encoded data transmitter which transmits the encoded game data transmitted by said first encoded data transmitter to said first game apparatus and said second game apparatus, and
each of said first and second game apparatuses further comprises a storage which stores the encoded game data transmitted by said second encoded data transmitter; and
A game system according to claim 6, wherein the game system further comprises a second decider which decides a group including a plurality of game apparatuses of the same kind that are configured to communicate with each other on a network, and
said encoder encodes the game data in a case that a group including said first game apparatus, said second game apparatus and said third game apparatus that play the game by using the game data transmitted by said first game data transmitter is decided by said second decider.

8. A game system according to claim 6, further comprising a decoding device configured to communicate with at least said third game apparatus, wherein
- each of said first and second game apparatuses further comprises a third encoded data transmitter which transmits the encoded game data stored by said storage to said third game apparatus,
- said third game apparatus further comprises a fourth encoded data transmitter which transmits said encoded game data transmitted by said third encoded data transmitter to said decoding device, and
- said decoding device further comprises
  - a decoder which decodes said encoded game data transmitted by said fourth encoded data transmitter, and
  - a second game data transmitter which transmits the game data decoded by said decoder to said third game apparatus.

9. A game system, including a first game apparatus, a second game apparatus and a third game apparatus that are configured to communicate with each other on a network, in which a first communication game is played between said first game apparatus and said second game apparatus, wherein
- said first game apparatus comprises a first input data transmitter which transmits in response to an input by a first user first input data corresponding to the input, to said third game apparatus;
- said second game apparatus comprises a second input data transmitter which transmits in response to an input by a second user second input data corresponding to the input, to said third game apparatus; and
- said third game apparatus not playing said first communication game comprises a first game processing executer which executes game processing of said first communication game on the basis of the first input data transmitted by said first input data transmitter and the second input data transmitted by said second input data transmitter, wherein the first game apparatus, the second game apparatus, and the third game apparatus are of the same type, wherein the game system further comprises a first decider which selects game apparatuses less than all of a plurality of game apparatuses communicating on the network by selecting a group including said first game apparatus, said second game apparatus and said third game apparatus from at least four game apparatuses communicating on the network;
- wherein the game system further comprises an encoding device configured to communicate with at least said third game apparatus; wherein
- said third game apparatus further comprises a first game data transmitter which transmits to said encoding device the game data changed in correspondence with game processing of said first communication game executed by said first game processing executer;
- wherein said encoding device further comprises
  - an encoder which encodes the game data transmitted by said first game data transmitter, and
  - a first encoded data transmitter which transmits encoded game data encoded by said encoder to said third game apparatus;
- wherein said third game apparatus further comprises a second encoded data transmitter which transmits the encoded game data transmitted by said first encoded data transmitter to said first game apparatus and said second game apparatus, and
- each of said first and second game apparatuses further comprises a storage which stores the encoded game data transmitted by said second encoded data transmitter;
- wherein the game system further comprises a decoding device configured to communicate with at least said third game apparatus; wherein
- each of said first and second game apparatuses further comprises a third encoded data transmitter which transmits the encoded game data stored by said storage to said third game apparatus,
- said third game apparatus further comprises a fourth encoded data transmitter which transmits said encoded game data transmitted by said third encoded data transmitter to said decoding device, and
- said decoding device further comprises
  - a decoder which decodes said encoded game data transmitted by said fourth encoded data transmitter, and
  - a second game data transmitter which transmits the game data decoded by said decoder to said third game apparatus, and wherein said decoder decodes said encoded game data in a case that a group including said first game apparatus, said second game apparatus and said third game apparatus that play the game by using the game data of the encoded game data transmitted by said fourth encoded game data transmitter is decided by said second decider.

10. A game system according to claim 8, wherein said first game processing executer executes said game processing of said first communication game on the basis of the first input data transmitted by said first input data transmitter, the second input data transmitted by said second input data transmitter, and the game data transmitted by said second game data transmitter.

11. A game system according to claim 1, wherein the same type of said first game apparatus, said second game apparatus and said third game apparatus include a game apparatus being the same configuration, respectively.

12. A game system according to claim 1, wherein said third game apparatus receives an input by a third user to a second communication game with a fourth game apparatus being different from said first game apparatus and said second game apparatus while said game processing of said first communication game is executed by said first game processing executer.

13. A game system according to claim 6, wherein the encoded game data is in a format that cannot be decoded by the first and second game apparatuses.

* * * * *